United States Patent Office 3,305,546
Patented Feb. 21, 1967

3,305,546
PROCESS FOR THE PRODUCTION OF 16-HALO-17(20)-PREGNENES
John E. Pike, Kalamazoo, Mich., assignor to The Upjohn Company, Kalamazoo, Mich., a corporation of Delaware
No Drawing. Filed Dec. 9, 1963, Ser. No. 329,272
19 Claims. (Cl. 260—239.55)

This invention is concerned with a novel process for the production of 16α- and 16β-halopregnanes, particularly with the production of 16α-halo-17(20)-pregnen-21-oate, wherein halogen is selected from the group consisting of chlorine and fluorine, the conversion of this product to anti-inflammatory 16α-halo derivatives of the hydrocortisone series and the novel intermediates in the process.

16-halohydrocortisones have been found to be extremely active corticoid hormones possessing particularly a high anti-inflammatory activity. Thus, 9α,16α-difluoroprednisolone was found to possess 89 times the anti-inflammatory activity of hydrocortisone, 6α-methyl-9α,16α-difluoroprednisolone 21-acetate 190 times the anti-inflammatory activity of hydrocortisone and 6α,9α,16α-trifluoroprednisolone 21-acetate had 480 times the anti-inflammatory activity of hydrocortisone. The 16α-chloro derivatives have even higher activity, for example 9α-fluoro-16α-chloroprednisolone acetate has an anti-inflammatory activity of 313 times that of hydrocortisone, 6α-methyl-9α-fluoro-16α-chloroprednisolone acetate has 85 times that of hydrocortisone, and 6α,9α-difluoro-16α-chloroprednisolone has 1103 times the anti-inflammatory activity of hydrocortisone. The 16β-halo compounds in this series also have anti-inflammatory activity, but to a lesser degree. It is therefore desirable to have means to produce 16-halo compounds of the hydrocortisone series.

The preparation of 16β-halo steroids can be carried out without much difficulty by splitting the 16,17-oxido bond of an available 16,17-oxido steroid compound with hydrogen halide with resulting formation of the corresponding 16β-halo-17α-hydroxy steroid. On the other hand, it was found difficult to obtain 16α-halo steroids of the hydrocortisone series, since the usual methods of substitution, such as substituting a hydroxy group with halogen, resulted in products other than those desired; for example 21-acetoxy-11β,16α-dihydroxy-1,4,17(20)-pregnatrien-3-one in the presence of thionyl chloride instead of adding the chlorine on the 16-position, produced rearrangement and added the chlorine on the 20-position so that 20-chloro-21-acetoxy-11β-hydroxy-1,4,16-pregnatrien-3-one was obtained [J.A.C.S. 82, 1252 (1960)].

The known method for obtaining 16α-halo compounds of the above structure was to treat Δ16-20(21)-oxido compounds with hydrogen fluoride or hydrogen chloride to add a halogen substituent in the 16-position. However, the obtained product contained also large amounts of 20-halogenated products, which had to be separated from the desired product. Additionally, this method required a fairly large number of steps to obtain the Δ16-20(21)-oxido starting compounds. Moreover, even in this method some 16β-halo compounds were obtained. Thus, the overall yields of 16α-halo compounds by this method were exceedingly small, based on starting materials, which were already highly developed steroids of a high cost.

The present invention represents an entirely novel synthesis of 16-halo steroids, providing these steroids in good yields and making use of starting materials readily available and well known in the art because used in the production of commercial steroids, e.g., hydrocortisone, prednisolone and substituted hydrocortisones and prednisolones.

The essential part of the present process can be presented by the following schemes:

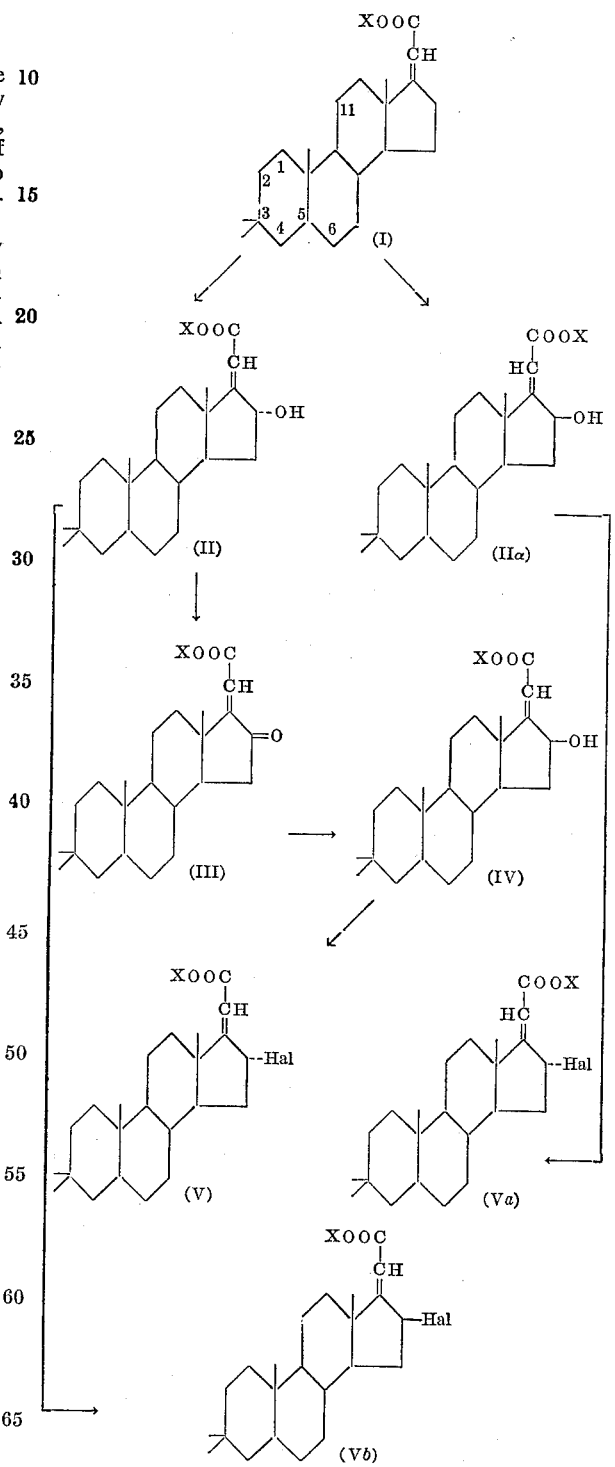

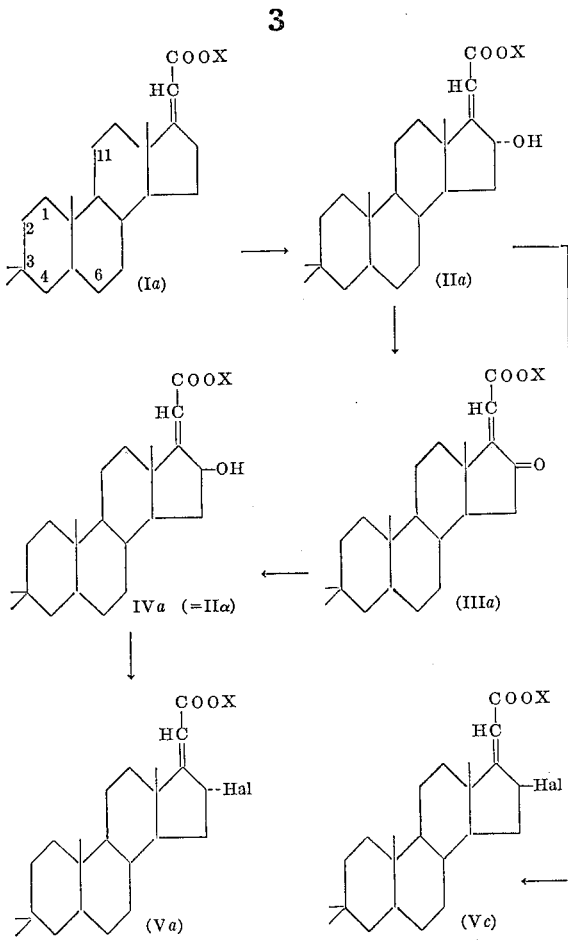

wherein X is selected from the group consisting of hydrogen and lower alkyl and wherein Hal stands for a halogen atom selected from the group consisting of chlorine and fluorine.

The basic process of the present invention consists of the following steps: a 17(20)-pregnen-21-oic acid or alkyl ester thereof, which may have the cis configuration (I) or the trans configuration (Ia), and which may have substituents in other positions, particularly double bonds in positions 1,2, 4,5 and 5,6; keto, hydroxy, acyloxy or ketal groups in the 3-position; substituents such as alkyl and halo in the 6-position, and oxygenated groups in the 11-position, particularly 11-keto and 11β-hydroxy, as well as other possible substituents, such as methyl and halo groups in positions 12, 14 and 15, is treated with selenium dioxide to give a 16-hydroxy-17(20)-pregnen-21-oic acid or alkyl ester thereof, which, depending on the starting material, will have the structure of Formulae II, IIα or IIa. If 16β-halo compounds are desired as end products, treating of the 16α-hydroxy-17(20)-pregnen-21-oic acids or esters of Formulae II and IIa with the halogenating agent described below will give the corresponding 16β-halo products of Formulae Vb and Vc, which can be converted to the final 16β-halo derivatives of the hydrocortisone series. Since, however, the more important products are 16α-halo compounds, the 16-hydroxy compounds of Formula II are converted to 16β-hydroxy steroids by (1) oxidation to give the corresponding 16-keto compounds of Formulae III and IIIa, and (2) reduction of the keto compounds to 16β-hydroxy-17(20)-pregnen-21-oic acid or ester thereof of Formulae IV and IVa. Compounds IV and IVa upon halogenation with the selected halogenation reagent will give the 16α-halo derivative, 16α-halo-17(20)-pregnen-21-oic acid or alkyl ester thereof of Formula V (cis form) or Formula Va (trans form). Compounds V and Va can be converted to the desired 16α-halohydrocortisones as shown in Examples 34–40.

The preferred fluorination agent, if 16α-fluorohydrocortisone type compounds are desired, is N-(2-chloro-1,1,2-trifluoroethyl)-dialkylamine, particularly diethylamines as described in U.S. Patent 3,056,807. The preferred chlorinating agents are of the formula:

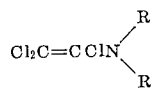

wherein R is a lower alkyl radical or phenyl radical. These trichlorovinylamines are described by Speziale et al., J. Am. Chem. Soc. 82, 903, 909 (1960). The most commonly used reagent of this type is the N,N-diethyl-1,2,2-trichlorovinylamine.

If the starting material is a 3-keto-Δ⁴-steroid of Formula I or Ia, the reaction with selenium dioxide also introduces the double bond in the 1,2-position.

In order to obtain the desired 16α-halohydrocortisone type compounds, a 16α-halo-17(20)-pregnen-21-oic acid or alkyl ester thereof of Formula V or Va is reduced so that the 21-carboxyl group or alkyl ester thereof becomes a 21-hydroxy group, with simultaneous reduction of an 11-keto to an 11β-hydroxy if present, and the resulting product is oxidatively hydroxylated. These steps are well known in the art and are, for example, disclosed in U.S. Patents 2,790,814, 2,735,856 and 2,781,343. The reduction requires that a 3-keto group be protected, such as by temporary conversion of the 3-keto group to a 3-enamine or 3-ketal as shown in the before-mentioned patents or by temporary formation of a 3-semicarbazone or 3-thiosemicarbazone group.

Among the novel intermediates in the present synthesis are the 16-substituted-17(20)-pregnen-21-oic acids and esters represented by Formula VI below:

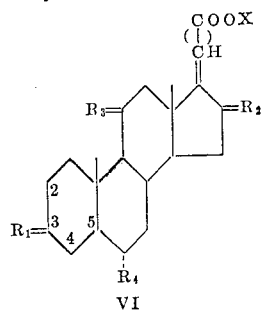

wherein $R_1$ is selected from the group consisting of keto oxygen,

and

in which Ac is an acyl radical of a hydrocarbon carboxylic acid containing from 1 to 12 carbon atoms, inclusive; wherein $R_2$ is selected from the group consisting of =O;

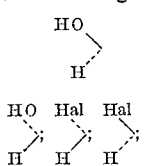

wherein Hal signifies halogen selected from the group consisting of chlorine and fluorine; wherein $R_3$ is selected from the group consisting of

and =O; wherein $R_4$ is selected from the group consisting of hydrogen, fluorine and methyl; wherein the linkages of carbon atoms 1,2 and 4,5 are selected from the group consisting of single and double bonds when $R_1$ is keto oxygen, and wherein X is selected from the group consisting of hydrogen and lower alkyl.

Another important intermediate in this invention is the 16-substituted-17(20)-pregnen-21-oic acid 3-ketals (VII), which can be presented by the following configuration:

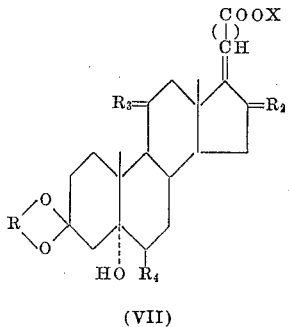

(VII)

wherein R is an alkylene radical containing up to 8 carbon atoms inclusive and the attaching oxygen to carbon bond is separated by a chain of at least two and not more than three carbon atoms; wherein $R_2$ is selected from the group consisting of =O;

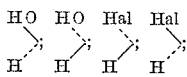

wherein Hal signifies halogen selected from the group consisting of chlorine and fluorine; wherein $R_3$ is selected from the group consisting of

and =O; wherein $R_4$ is selected from the group consisting of hydrogen, fluorine and methyl; and wherein X is selected from the group consisting of hydrogen and lower alkyl.

Another important intermediate is the 16-halo-17(20)-pregnen-21-ols having the following formula:

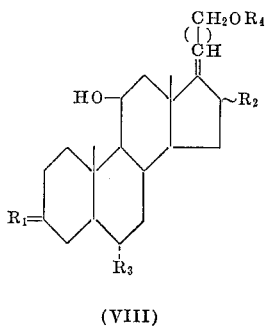

(VIII)

wherein $R_1$ is selected from the group consisting of =O;

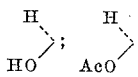

wherein Ac is an acyl radical of a hydrocarbon carboxylic acid containing from 1 to 12 carbon atoms; wherein $R_2$ is a halogen selected from the group consisting of chlorine and fluorine; wherein $R_3$ is selected from the group consisting of hydrogen, fluorine and methyl; and wherein $R_4$ is selected from the group consisting of hydrogen and acyl, wherein the acyl radical is defined as above.

An additional important intermediate is the 3-keto-16-halo-21-hydroxy-17(20)-pregnene 3-cyclic ethylene acetals of the formula:

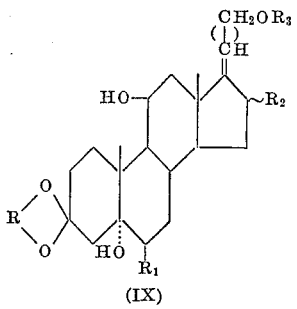

(IX)

wherein R is an alkylene radical containing up to 8 carbon atoms, inclusive and the attaching oxygen to carbon bonds are separated by a chain of at least 2 and not more than 3 carbon atoms; wherein $R_1$ is selected from the group consisting of hydrogen, methyl and fluorine, wherein $R_2$ is a halogen selected from the group consisting of chlorine and fluorine, and wherein $R_3$ is selected from the group consisting of hydrogen and an acyl radical of a hydrocarbon carboxylic acid containing up to 12 carbon atoms, inclusive.

The straight line in parentheses (|), used in Formulae VI, VII, VIII and IX is the symbol herein used to indicate a linkage selected from cis and trans linkages, which connect the 21-carboxyl or carboxyalkyl group to the 17(20)-double bond. The wavy line in Formulae VIII and IX (~), is the conventionally used symbol to indicate a linkage selected from α- and β- linkages.

The present invention provides a novel elegant method for the production of 16α-halogenated steroids of high anti-inflammatory activity. It also provides a method to produce various 16-hydroxy, 16-halo and 16-keto steroid intermediates of the pregnene series. These intermediates are used in the production of the final 16-halo steroids of the hydrocortisone series and are further useful in the production of other highly active steroids; for example 16-hydroxy steroids can be used in the production of lactones adding an additional fifth ring to the steroid skeleton.

The starting materials in this reaction are cis and trans 17(20)-pregnen-21-oic acids and alkyl esters of Formula I and Ia, in which the alkyl group may have from 1 to 8 carbon atoms, such as methyl, ethyl, propyl, isopropyl, butyl, t-butyl, pentyl, hexyl, heptyl, octyl, and the like. The compounds may further have a keto group in position 3, 11, 15, or the like, cyclic acetal groups, double bonds, as in positions 1, 4 and 5; halogen, hydroxy and alkyl substituents, as in positions 5, 6, 9, 14, 15, and the like. Representative starting materials include methyl 3,11-diketo-cis(and trans)-4,17(20)-pregnadien-21-oate; methyl 3,11-diketo-cis(and trans)-1,4,17(20)-pregnatrien-21-oate; methyl 5α-hydroxy-6β-methyl-3,11-diketo-cis-17(20)-pregnen-21-oate, 3-cyclic ethylene acetal; methyl 5α-hydroxy-6β-fluoro - 3,11-diketo-cis-17(20)-pregnen-21-oate, 3-cyclic ethylene acetal; methyl 3β-acetoxy-11-keto-5α-cis-17(20)-pregnen-21-oate; methyl 3,11-diketo-5α-cis-17(20) - pregnen-21-oate, 3-cyclic ethylene acetal, and the like.

In carrying out the process of the present invention a 17(20)-pregnen-21-oic acid (I) or (Ia) or alkyl ester is reacted with selenium dioxide in an organic solvent. Any solvent inert to selenium dioxide (and of course toward the steroid) can be used such as alcohols, for example isopropyl alcohol, secondary and t-butyl alcohol, tetrahydrofuran, pyridine, dioxane, methylene dichloride, dimethylformamide, dimethylsulfoxide, toluene, acetic acid, mixtures thereof, and the like. The reaction temperature may vary between 0° and 200° C. and is more commonly between 50 and 150° C., usually at the reflux temperature of the mixture. The selenium dioxide is generally used in a large excess between 2 to 6 moles per mole of steroid. Amounts of selenium dioxide smaller than 2 moles or larger than 6 moles per mole of steroid are operative, but are of no advantage. The reaction time is generally several hours, between 2 and 48 hours. At the termination of the reaction, the material, a 16-hydroxy-17(20)-pregnen-21-oic acid or ester thereof (II, IIα or IIa) is recovered and purified by conventional methods, for example filtration to eliminate the solids, such as selenium dioxide, extraction with organic water-immiscible solvents, e.g., ethyl acetate, ether, methylene dichloride, etc., evaporation of the extracts, recrystallization, fractional recrystallization and chromatography using organic solvent such as Skellysolve B hexanes, acetone, methanol, ethanol, methylene chloride, tetrahydrofuran, and the like, to separate possible isomers (II, IIα, IIa) and to purify the obtained 16-hydroxy-17(20)-pregnan-21-oic acid ester.

In this hydroxylation procedure, the cis steroid starting material, cis-17(20)-pregnen-21-oic acid alkyl ester, provides alkyl 16α-hydroxy-cis-17(20)-pregnen-21-oate and alkyl 16β-hydroxy-trans-17(20)-pregnen-21-oate, while the trans isomer provides alkyl 16α-hydroxy-trans-17(20)-pregnen-21-oate. Reaction of these 16-hydroxy steroid compounds with the halogenating reagents herein used inverts the position of the 16-substituent; thus, from a 16α-hydroxy steroid a 16β-halo steroid is obtained and from a 16β-hydroxy steroid a 16α-halo steroid is obtained. Since the 16α-halo steroids are generally the more desired ones, it is necessary to have for the next step 16β-hydroxy steroids available. Two procedures can be used to convert 16α-hydroxy steroids to 16β-hydroxy steroids:

(1) The alkyl 16α-hydroxy-17(20)-pregnen-21-oate or a mixture containing also the 16β-epimer is oxidized for example with chromic anhydride, chromic anhydride-pyridine complex, or activated manganese dioxide [J. Attenburrow, J. Chem. Soc., 1094–1111(1952)] to give the corresponding alkyl 16-keto-17(20)-pregnen-21-oate. The thus-obtained 16-keto steroid is selectively reduced to the 16b-hydroxy steroid by the use of lithium tri-t-butoxyaluminum hydride [Li(t-BuO)₃AlH, wherein t-Bu is the t-butyl radical] or mixtures of triethylaluminum-diethylaluminum hydride. This reaction is carried out preferably in tetrahydrofuran, at room temperature, 15–30° C. However, other solvents, diethyl ether, dibutyl ether or the like can be used and temperatures between 0° and 40° C. are operable. At the termination of the reaction, the hydrogenation agent is destroyed for example by the addition of acetic acid, and the product is isolated and purified by conventional procedures, such as extraction with water-immiscible solvents such as hexanes, benzene, ether, methylene chloride, or the like, crystallization and chromatography using Skellysolve B hexanes, acetone, methylene chloride, ethylene chloride, ethyl acetate, mixtures thereof and the like.

(2) In the other method, methyl 16α-hydroxy-17(20)-pregnen-21-oate is converted to the 16β-hydroxy compound by first esterifying the product with an organic sulfonyl chloride to obtain the corresponding organic sulfonate and reacting the sulfonate with a salt of a lower hydrocarbon carboxylic acid, e.g., acetic acid and hydrolyzing the thus-obtained ester.

In the preferred procedure, this is achieved by reacting a methyl 16α-hydroxy-17(20)-pregnen-21-oate compound with methanesulfonyl chloride or toluenesulfonyl chloride in pyridine solution at low temperature, for example −5 to +10° C. for a period of 18 hours. In this manner the 16α-methanesulfonate or 16α-toluenesulfonate of methyl 16α-hydroxy-17(20)-pregnen-21-oate is obtained, which is then reacted with sodium or potassium acetate, or preferably tetrabutylammonium acetate at a temperature between 15 and 30° C. in a ketone such as acetone, methyl ethyl ketone, diethyl ketone, and the like. The products of the esterification procedures are isolated and purified by conventional methods such as extraction, crystallization and chromatography with solvents such as Skellysolve B hexanes, cyclohexane, ethyl acetate, acetone, methylene chloride, methyl ethyl ketone, ether, mixtures of such solvents, and the like. The hydrolysis of the thus-obtained methyl 16β-acetoxy-17(20)-pregnen-21-oate is carried out by standard procedures, such as heating a methanolic or ethanolic solution of the 16β-acetoxy steroid with sodium or potassium bicarbonate, dissolved in a small amount of water. After the hydrolysis is terminated, the material is isolated and purified by standard methods, such as extraction with water-insoluble solvents, for example methylene chloride, cyclohexane, Skellysolve B hexanes, ether, or the like and is purified by recrystallization from solvents such as acetone-Skellysolve B hexanes, methanol, or the like. The examples illustrate further the manner of conversion of 16α-hydroxy-17(20)-pregnen-21-oate to the corresponding 16β-isomers.

Halogenation of the alkyl 16-hydroxy-17(20)-pregnen-21-oate has often resulted in unusual compounds, for example a shift in double bonds and halogenation on a place other than the desired 16-position. For example, chlorination of methyl 16α-hydroxy-3,11-diketo-cis-1,4,17(20)-pregnatrien-21-oate in anhydrous ether and methylene chloride with thionyl chloride resulted principally in a 20-chloro compound, namely methyl 20-chloro-3,11-diketo-1,4,16-pregnatrien-21-oate.

On the other hand, consistent and uniform 16-halo steroids were obtained when halogenation was made with special reagents, namely with N-(2-chloro-1,1,2-trifluoroethyl)-diethylamine for fluorination, or with N,N-diethyl-1,2,2-trichlorovinylamine for chlorination.

Fluorination is best carried out in an inert organic solvent such as aromatic and aliphatic hydrocarbons, halogenated hydrocarbons, esters, ketones, ethers, and tertiary alcohols, such solvents including benzene, toluene, chlorobenzene, pentanes, hexanes, cyclohexanes, ethyl acetate, butyl acetate, acetone, methyl ethyl ketone, tetrahydrofuran, t-butyl alcohol, t-amyl alcohol, and the like. The solvent particularly preferred in this reaction is methylene chloride.

While the preferred fluorinating agent is N-(2-chloro-1,1,2-trifluoroethyl)-diethylamine, other fluorinating agents of the general formula:

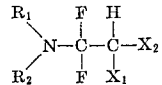

wherein $R_1$ and $R_2$ are lower alkyl and wherein $X_1$ is selected from the class consisting of chlorine and fluorine, and $X_2$ is selected from the class consisting of chlorine, fluorine, and trifluoromethyl, can be used. Examples of such fluorinating agents are N-(1,1,2,2-tetrafluoroethyl)-diethylamine, N-(2-chloro-1,1,2-trifluoroethyl)-dimethylamine, N-(2-chloro-1,1,2-trifluoroethyl)-dipropylamine, and other N-(2-chloro-1,1,2-trifluoroethyl)-dialkylamines in which the alkyl is a lower alkyl having from 1 to 6 carbon atoms, such as butyl, isobutyl, pentyl, hexyl, and the before-mentioned ethyl, methyl and propyl alkyls. The reaction is preferably carried out within the temperature range of about 0° C. up to the boiling point of the reaction mixture. The reaction time employed to complete the fluorination varies according to the reaction temperature and is generally of the order of 1 to 18 hours at temperatures between 0 and about 30° C. Shorter reaction time can be employed at higher reaction temperatures. The fluorinating agent is employed in excess of the stoichiometric quantity based on the steroid. One and one-tenth to ten moles of fluorinating agent is used per mole of starting steroid. The thus-obtained 16-fluoro steroid is isolated and purified by conventional procedures, for example by evaporating the solvent and recrystallizing the product or by extraction, recrystallization or chromatography using solvents and solvent systems such as methylene chloride, acetone-Skellysolve B hexanes, ethyl acetate, acetone, methyl alcohol, and the like.

The chlorination of alkyl 16-hydroxy-17(20)-pregnen-21-oates is preferably carried out with N,N-diethyl-1,2,2-trichlorovinylamine in an organic solvent. As solvent, methylene chloride, ethylene chloride, benzene, toluene, and the like can be used. The chlorinating agent is an N,N-dilower-alkyl-1,2,2-trichlorovinylamine in which the lower alkyl group may be methyl, ethyl, propyl, isopropyl, butyl, isobutyl, pentyl, 2-methylbutyl, hexyl, 2,2-dimethylbutyl, and the like. The preferred reagent is the N,N-diethylamino-1,2,2-trichlorovinylamine. The chlorinating reagent is generally used in an excess of 2 to 10 moles per mole of steroid. The reaction is usually carried out at a temperature between $-10°$ and room temperature (about 25° C.), but higher or lower reaction temperatures can be used if desired. The reaction period is usually between 1 and 12 hours, but longer or shorter reaction periods are operative. In the preferred embodiment of the invention, the reaction is carried out in a nitrogen atmosphere at a temperature between 5 and 25° C. for a period of about 2 to 4 hours.

At the termination of the reaction the products are obtained by conventional procedures of recovery and purification, such as extraction, recrystallization, chromatography, or the like, carried out with commonly available solvents, such as methylene chloride, Skellysolve B hexanes, cyclohexanes, acetone, ethyl acetate, or the like. If the starting material had a cyclic acetal group, such as is the case in several of the examples in this application, the acetal group is often eliminated and the 3-keto compound is obtained. If for subsequent chemical reactions, the acetal group is necessary, the crude material before purification can be re-ketalized by conventional methods, such as heating the 3-keto steroid at reflux temperature with ethylene glycol in the presence of an acid catalyst like toluenesulfonic acid in benzene solution under conditions in which the water formed in the reaction is removed, for example by azeotropic distillation. In this manner, as the 16-chloro-3-ketal of the 1(20)-pregnen-21-oic acid ester.

The thus-obtained 16-halo steroid can be reduced with lithium aluminum hydride providing that the 16-halogen is fluorine or can be reduced with di-isobutyl aluminum hydride when the 16-halo substituent is chlorine. Chlorine in the 16-position is easily removed by lithium aluminum hydride. The reduction is carried out usually in anhydrous diethyl ether, dipropyl ether, benzene, or tetrahydrofuran at low temperatures, usually between $-10$ and $+10°$ C. The time of reduction is between several minutes and 2 hours, after which time the reducing agent is decomposed by the addition of ethyl acetate or water. The reduction takes place both on the 21-carboxyl group of the 17(20)-pregnen-21-oate alkyl ester as well as on any free keto group such as an 11-keto group. After the reduction the material is obtained generally by extraction, recrystallization, and if necessary chromatography, and is additionally recrystallized, if necessary, to purify it. Common solvents, such as Skellysolve B hexanes, cyclohexane, ethyl acetate, acetone, and methanol are used in the purification and recovery.

Additional steps to convert thus-obtained 16-halo-17(20)-pregnen-21-ol compounds to 16-halogenated hydrocortisone type compounds are made by known procedures such as esterifying the 21-hydroxy group and treating the product with osmium tetroxide in the presence of an organic peroxide such as N-morpholine oxide peroxide to introduce the 17-hydroxy-20-keto moiety into the molecule. Cyclic acetal groups (ketal groups) are removed by acid hydrolysis, which at the same time will introduce a $\Delta^4$-moiety if the original cyclic acetal was a 3-keto-5-hydroxy steroid, 3-cyclic ethylene acetal. Additional procedures will also include the introduction of the $\Delta^1$-moiety by reacting the 16-halohydrocortisone type compounds with selenium dioxide or exposing it to the influence of 1-dehydrogenating microorganisms such as Corynebacteria, Septomyxa, Fusarium and the like, and introduction of a 9α-halo moiety by methods well known [Fried, J. Am. Chem. Soc. 75, 2273 (1953); ibid., 76, 1455 (1954)].

The subsequent examples illustrate the before-mentioned described methods.

EXAMPLE 1.—METHYL 16α - HYDROXY-3,11 - DIKETO-CIS-1,4,17(20)-PREGNATRIEN - 21 - OATE AND METHYL 16β-HYDROXY - 3,11 - DIKETO-TRANS-1,4,17(20)-PREGNATRIEN-21-OATE

A reaction mixture of 50 g. of methyl 3-11-diketo-cis-4,17(20)-pregnadien-21-oate, 50 g. of selenium dioxide, 1500 ml. of t-butyl alcohol and 5 ml. of acetic acid was heated to reflux in a nitrogen atmosphere for a period of 24 hours. The reaction mixture was thereupon allowed to cool and was then filtered through a layer of diatomaceous earth (Celite) and magnesium silicate. The filter cake was washed carefully with ethyl acetate and the filtrate and washings combined and evaporated to dryness. The ethyl acetate solution was washed successively with aqueous sodium bicarbonate solution, freshly prepared ice-cold ammonium sulfide solution, aqueous dilute ammonium, aqueous dilute hydrochloric acid, aqueous sodium bicarbonate and water. The washings were discarded and the organic layer was dried over sodium sulfate and evaporated to dryness in vauco. The crude material (51 g.) was dissolved in methylene chloride and chromatographed over 1500 g. of Florisil, the column being eluted with increasing percentages of acetone in Skellysolve B hexane solutions. Two main peaks were observed:

(1) *Eluted first from the chromatogram.* — 13.4 g. of material, which upon crystallization from acetone-Skellysolve B hexanes gave 10 g. of material of melting point 205–207° C. (first crop); and 2 g. of material of melting point 197–199° C. (second crop). This material (first crop) was recrystallized from acetone and Skellysolve B hexanes to give methyl 16β-hydroxy-3,11-diketo - trans-1,4,17(20)-pregnatrien - 21 - oate of melting point 206–208° C. and having the following analysis and physical constants:

*Analysis.*—Calcd. for $C_{22}H_{26}O_5$: C, 71:33; H, 7.08. Found: C, 70.87; H, 7.25.

$$\lambda^{EtOH}_{max.}, 231\ m\mu,\ \epsilon 22{,}400;\ \frac{A_{231}}{A_{251}}=1.61$$

(2) *The material later eluted.*—18.1 g., which was recrystallized from acetone-Skellysolve B haxanes to give 8.6 g. of material melting at 241–246° C. Further purification by recrystallization from acetone-Skellysolve B hexanes gave material having a melting point of 225–258° C., and analysis and physical constants as follows:

*Analysis.*—Calcd. for $C_{22}H_{26}O_5$: C, 71.33; H, 7.08. Found: C, 71.00; H, 7.21.

$$\lambda^{EtOH}_{max.}\ 233\ m\mu;\ \epsilon 20{,}800;\ \frac{A_{233}}{A_{253}}=1.68$$

This material was methyl 16α-hydroxy-3,11-diketo-cis-1,4,17(20)-pregnatrien-21-oate.

Using less harsh reaction conditions, 16-hydroxylation can be achieved without concomitant 1,2-dehydrogenation as shown in Example 1A.

EXAMPLE 1A. — METHYL 16α-HYDROXY-3,11-DIKETO - CIS - 4,17(20) - PREGNADIEN - 21 - OATE AND METHYL 16β - HYDROXY - 3,11 - DIKETO-TRANS-4,17(20)-PREGNADIEN-21-OATE

A reaction mixture of 10 g. of methyl 3,11-diketo-cis-4,17(20)-pregnadien-21-oate, 400 ml. of tetrahydrofuran and 10 g. of selenium dioxide was stirred and refluxed in a nitrogen atmosphere for 4 hours. The reaction mixture was cooled and was then filtered through a layer of diatomaceous earth (Celite). The filter cake was washed with 50 ml. of ethyl acetate and the washings added to the filtrate. The combined filtrate and washings were evaporated in vacuo. The residue thus obtained was redissolved in 400 ml. of ethyl acetate. This solution was washed with freshly prepared, ice-cold ammonium polysulfide, dilute aqueous ammonia, cold dilute hydrochloric acid, water, saturated sodium bicarbonate solution and then dried over anhydrous sodium sulfate. The thus-obtained mixture was evaporated to dryness, and the thus-obtained residue redissolved in methylene chloride and chromatographed over 600 g. of synthetic magnesium silicate (Florisil), taking fractions of 350 ml. each.

CHROMATOGRAM

| Fractions | Solvent | Weight of Residue |
|---|---|---|
| 1–10 | 10% acetone, 90% Skellysolve B hexanes | Negligible. |
| 11–17 | 20% acetone, 80% Skellysolve B hexanes | |
| 18 | ----do---- | 0.113 |
| 19 | ----do---- | 0.287 |
| 20 | ----do---- | 0.475 |
| 21 | ----do---- | 0.571 |
| 22 | ----do---- | 0.545 } 2.940 |
| 23 | ----do---- | 0.428 |
| 24 | ----do---- | 0.300 |
| 25 | ----do---- | 0.203 |
| 26 | ----do---- | 0.131 |
| 27 | ----do---- | 0.088 |
| 28 | ----do---- | 0.075 |
| 29 | 40% acetone, 60% Skellysolve B hexanes | 0.072 |
| 30 | ----do---- | 0.091 |
| 31 | ----do---- | 0.474 |
| 32 | ----do---- | 0.531 } 1.288 |
| 33 | ----do---- | 0.283 |
| 34 | ----do---- | 0.201 |
| 35 | ----do---- | 0.349 |
| 36 | ----do---- | 0.311 |
| 37 | ----do---- | 0.275 |
| 38 | ----do---- | 0.236 |
| 39 | ----do---- | 0.174 |
| 40 | ----do---- | 0.131 |

Fractions 19–26 were combined and recrystallized from acetone-Skellysolve B hexanes (1:2) to give 2.38 g. of methyl 16$\beta$ - hydroxy - 3,11 - diketo - trans - 4,17(20)-pregnadien-21-oate of melting point 220–226° C. and rotation $[\alpha]_D +214°$ in chloroform.

*Analysis.*—Calcd. for $C_{22}H_{28}O_5$: C, 70.94; H, 7.58. Found: C, 71.20; H, 7.87.

Fractions 31–33, 1.288 g., were found to be methyl 16$\alpha$-hydroxy-3,11-diketo-cis-4,17(20)-pregnadien-21-oate.

EXAMPLE 2. — METHYL 16$\alpha$-HYDROXY-3,11-DIKETO - CIS - 1,4,17(20) - PREGNATRIEN - 21-OATE AND METHYL 16$\beta$-HYDROXY-3,11-DIKETO - TRANS - 1,4,17(20) - PREGNATRIEN - 21-OATE In the same manner given in Example 1, methyl 3,11-diketo-cis-1,4,17(20)-pregnatrien-21-oate (20 g.) was reacted with selenium dioxide in the presence of acetic acid in t-butyl alcohol. Chromatography gave 3.4 g. of methyl 16$\beta$-hydroxy-3,11-diketo-trans-1,4,17(20)-pregnatrien-21-oate and 1.87 g. of methyl 16$\alpha$-hydroxy-3,11-diketo-cis-1,4,17(20)-pregnatrien-21-oate.

EXAMPLE 3. — METHYL 16$\alpha$-HYDROXY-3,11-DIKETO - TRANS - 1,4,17(20) - PREGNATRIEN - 21-OATE AND METHYL 3,11 - DIKETO - TRANS-4,17(20)-PREGNADIEN-21-OATE A. A solution was prepared containing 107 g. of methyl 3,11-diketo-cis-4,17(20)-pregnadien-21-oate in 1750 ml. of methanol and 250 ml. of methanolic 25% sodium hydroxide solution. The reaction mixture was heated to reflux for 2 hours in a nitrogen atmosphere. At the end of this period the methanol was removed in vacuo and the residue taken up in methylene chloride. The organic solution was washed with water until neutral and the aqueous layer was back-extracted with methylene chloride. The methylene chloride solution and washes were combined, dried over anhydrous sodium sulfate, and the solvent (methylene chloride) was removed to give 95.6 g. of crude product. The crude product was dissolved in 250 ml. of methylene chloride and chromatographed over 1500 g. of Florisil anhydrous magnesium silicate using Skellysolve B hexanes and acetone, up to 25%, as diluent. The main crystalline factions were combined and recrystallized from acetone and Skellysolve B hexanes to give 51.4 g. of methyl 3,11-diketo-trans-4,17(20)-pregnadien-21-oate having a melting point of 144–146° C. In a second crop 15 g. of the same material was obtained having a melting point of 140–143° C.

B. A reaction mixture was prepared containing 25 g. of methyl 3,11-diketo-trans-4,17(20)-pregnadien-21-oate of melting point 144–146° C., 750 ml. of t-butyl alcohol, 2.5 ml. of acetic acid and 25 g. of selenium dioxide. This reaction mixture was heated to reflux for a period of 18 hours under nitrogen. After cooling, the mixture was filtrated through diatomaceous earth (Celite) and magnesium silicate. The filter cake was washed with ethyl acetate and the filtrate and washings were combined. The filtrate was thereupon evaporated to dryness and the residue was taken up in ethyl acetate which was washed successively with sodium bicarbonate solution, freshly prepared ice-cold ammonium sulfide solution, aqueous dilute ammonia, aqueous dilute hydrochloric acid, aqueous sodium bicarbonate solution and water. The remaining organic layer was dried over sodium sulfate and evaporated to dryness in vacuo. The crude material was dissolved in methylene chloride and chromatographed over 1500 g. of Florisil anhydrous magnesium silicate using gradient elution with Skellysolve B hexanes to 50% acetone–50% Skellysolve B hexanes. Two peaks were obtained:

(1) *Eluted first from the chromatogram.*—6.655 g. of material which upon recrystallization was shown to be the 1-dehydro derivative of the starting material, namely methyl 3,11-diketo-trans-1,4,17(20)-pregnatrien-21-oate having, after recrystallization from acetone and Skellysolve B hexanes, a melting point of 149–151° C.

(2) The second peak gave 9.19 g. of crude material, which after several crystallizations from ether and thereupon from acetone and Skellysolve B, gave methyl 16$\alpha$-hydroxy - 3,11 - diketo - trans - 1,4,17(20) - pregnatrien-21-oate of melting point 164–167° C. and an analysis as follows:

*Analysis.*—Calcd. for $C_{22}H_{26}O_5$: C, 71.33; H, 7.08. Found: C, 70.03; H, 6.83.

EXAMPLE 4.—METHYL 5$\alpha$,16$\beta$ - DIHYDROXY - 6$\beta$-METHYL - 3,11 - DIKETO - TRANS - 17(20)-PREGNEN - 21 - OATE, 3-CYCLIC ETHYLENE ACETAL AND METHYL 5$\alpha$,16$\alpha$-DIHYDROXY-6$\beta$-METHYL - 3,11 - DIKETO - CIS - 17(20) - PREGNEN-21-OATE, 3-CYCLIC ETHYLENE ACETAL In a round-bottomed flask of 1 liter, 10 g. of methyl 5$\alpha$ - hydroxy - 6$\beta$ - methyl - 3,11 - diketo - cis - 17(20)-pregnen-21-oate 3-cyclic ethylene acetal, 10 g. of selenium dioxide, and 400 ml. of tetrahydrofuran were placed. This mixture was stirred and refluxed for a period of 6 hours. Thereafter the reaction mixture was cooled to room temperature and filtered through a pad of Celite diatomaceous earth. The Celite pad was washed with 300 ml. of ethyl acetate. The filtrate was diluted with 1700 ml. of water. The mixture was thereupon extracted with three 300 ml. portions of ethyl acetate, using as the first portion the 300 ml. of ethyl acetate used in the washing of the Celite pad. The ethyl acetate extracts were thereupon combined, washed with water and dried over anhydrous sodium sulfate. The filtrate was thereupon filtered to remove particles of the drying agent and distilled in a 2 liter round-bottomed flask fitted with a stirrer and a condenser for distillation. Ten grams of Darco (activated charcoal) were added. The distillation was continued under stirring until about 400 ml. of reaction mixture remained in the flask. This material was allowed to cool and was thereupon filtered through Celite diatomaceous earth, and the thus-obtained filtrate was concentrated to dryness at 50° C. under reduced pressure. The obtained residue was dissolved in 600 ml.

of methylene chloride and chromatographed over a column containing 300 g. of Florisil, taking fractions of 600 ml. as follows:

| Fraction No. | Solvent | Wt. Res., g. | |
|---|---|---|---|
| 1 | CH₂Cl₂ | .219 | |
| 2 | Skellysolve B hexanes+5% acetone | .066 | |
| 3 | do | .803 | |
| 4 | do | 1.043 | |
| 5 | do | .964 | A |
| 6 | do | .785 | 5.651 |
| 7 | Skellysolve B hexanes+7.5% acetone | 1.140 | |
| 8 | do | .630 | |
| 9 | do | .286 | |
| 10 | do | .127 | |
| 11 | do | .090 | |
| 12 | Skellysolve B hexanes+10% acetone | .117 | |
| 13 | do | .145 | |
| 14 | do | .146 | |
| 15 | do | .083 | |
| 16 | do | .440 | B |
| 17 | Skellysolve B hexanes+15% acetone | 1.054 | 3.139 |
| 18 | do | .956 | |
| 19 | do | .586 | |
| 20 | do | .281 | |
| 21 | do | .117 | |
| 22 | Acetone | .440 | |
| 23 | do | .008 | |

Fraction A was recrystallized from acetone to yield 5.57 g. of methyl 5α,16β-dihydroxy-6β-methyl-3,11-diketo-trans-17(20)-pregnen-21-oate, 3-cyclic ethylene acetal having a melting point of 190–194° C. (54% yield). A further purified analytical sample crystallized from acetone had a melting point of 192–194° C. and a rotation [α]_D +36° in chloroform.

Fraction B was recrystallized from acetone-Skellysolve B hexanes to yield 2.50 g. (24% yield) of methyl 5α,16α-dihydroxy-6β-methyl-3,11-diketo-cis-17(20) - pregnene-21-oate, 3-cyclic ethylene acetal of melting point 205–210° C., which when recrystallized from acetone, gave a sample melting at 213–215° C. having a rotation [α]_D of −9° in chloroform.

EXAMPLE 5.—METHYL 5α,16β - DIHYDROXY - 6β-FLUORO-3,11-DIKETO-TRANS-17(20)-PREGNEN-21-OATE, 3-CYCLIC ETHYLENE ACETAL AND METHYL 5α,16α - DIHYDROXY-6β-FLUORO-3,11-DIKETO-CIS 17(20)-PREGNEN-21-OATE, 3-CYCLIC ETHYLENE ACETAL

Into a round-bottomed 1 liter flask fitted with a stirrer and a condenser was placed 10 g. of methyl 5α-hydroxy-6β-fluoro-3,11-diketo-cis-17(20)-pregnen-21-oate, 3-cyclic ethylene acetal, 10 g. of selenium dioxide and 400 ml. of tetrahydrofuran. The mixture was refluxed with stirring for a period of 6 hours. Thereafter, the reaction mixture was allowed to cool to room temperature and was then filtered through a pad of Celite diatomaceous earth. The Celite filter was washed with 300 ml. of ethyl acetate. The filtrate was diluted with 1700 ml. of water and the aqueous reaction mixture was extracted with three 300-ml. portions of ethyl acetate using as the first portion the ethyl acetate washings of the Celite filter. The ethyl acetate extracts were then combined, washed with water and dried over anhydrous sodium sulfate. Thereafter, the extracts were filtered and the filtrate placed in a 2 liter round-bottomed flask fitted with a stirrer and condenser for distillation. Ten grams of Darco G-60 (activated charcoal) was added to the reaction flask. The reaction mixture was then distilled under stirring until about 400 ml. remained in the flask. The 400 ml. were allowed to cool and were then filtered through Celite to remove the charcoal and the thus-obtained filtrate was concentrated to dryness at 50° C. under reduced pressure. The thus-obtained solid was dissolved in 600 ml. of methylene chloride and chromatographed over a column containing 300 g. of Florisil. Fractions of 600 ml. were taken as follows:

| Fraction No. | Solvent | Wt. Res., g. | |
|---|---|---|---|
| 1 | CH₂Cl₂ | .163 | |
| 2 | Skellysolve B hexanes +5% acetone | .017 | |
| 3 | do | .323 | |
| 4 | do | 1.014 | |
| 5 | do | .807 | |
| 6 | do | .950 | A |
| 7 | Skellysolve B hexanes +7.5% acetone | 1.324 | 5.115 |
| 8 | do | .718 | |
| 9 | do | .302 | |
| 10 | do | .106 | |
| 11 | do | .080 | |
| 12 | Skellysolve B hexanes +10% acetone | .127 | |
| 13 | do | .129 | |
| 14 | do | .230 | |
| 15 | do | .402 | |
| 16 | do | .656 | |
| 17 | Skellysolve B hexanes +15% acetone | 1.083 | B |
| 18 | do | .639 | 3.250 |
| 19 | do | .342 | |
| 20 | do | .138 | |
| 21 | do | .077 | |
| 22 | Acetone | .421 | |
| 23 | do | .002 | |

Fraction A was crystallized from acetone to give in two yields 4.28 g. (41%) of methyl 5α,16β-dihydroxy-6β-fluoro-3,11-diketo-trans-17(20) - pregnen-21-oate, cyclic ethylene acetal, having a melting point of 288–236° C. An analytical sample recrystallized from acetone had a melting point of 234–235° C. and a rotation [α]_D of +24° in acetone.

Fraction B was recrystallized from ether to give 2.58 g. (25%) of methyl 5α,16α-dihydroxy-6β-fluoro-3,11-diketo-cis-17(20)-pregnen-21-oate, cyclic ethylene acetal of melting point 157–165° C., which upon recrystallization from ether gave an analytical sample melting at 160–162° C. and having a rotation [α]_D of −15° in acetone.

EXAMPLE 6.—METHYL 3β,16β - DIHYDROXY - 11-KETO-5α-TRANS-17(20) - PREGNEN-21-OATE 3-ACETATE AND METHYL 3β,16α-DIHYDROXY-11-KETO-5α-CIS-17(20) - PREGNEN - 21 - OATE 3-ACETATE

Methyl 3β - acetoxy-11-keto-5α-cis-17(20)-pregnen-21-oate was prepared from methyl 3β-hydroxy-11-keto-5α-cis-17(20)-pregnen-21-oate (40 g.), treated with 100 ml. of acetic anhydride in 200 ml. of pyridine and heating this mixture on the steam bath for 30 minutes. A total of 32.8 g. of methyl 3β-acetoxy-11-keto-5α-cis-17(20)-pregnen-21-oate was obtained having a melting point of 128–133° C.

A solution was prepared containing 5 g. of methyl 3β-acetoxy-11-keto-5α-cis-17(20)-pregnen-21-oate and 150 ml. of t-butyl alcohol. This solution was stirred and refluxed in a nitrogen atmosphere for 18 hours in the presence of 5 g. of selenium dioxide and 0.5 ml. of acetic acid. The reaction mixture was then cooled to room temperature and filtered through a bed of Celite diatomaceous earth. The residue was rinsed with a little ethyl acetate. The filtrate and washings were concentrated to nearly dryness by distillation in vacuo from steam baths. The residue was taken up in ethyl acetate and washed successively with 2% sodium bicarbonate solution, fresh ice-cold ammonium polysulfide, aqueous dilute ammonia, aqueous ice-cold hydrochloric acid, aqueous saturated sodium bicarbonate solution and water. The washed extract was dried over anhydrous sodium sulfate and concentrated to an off-white crystalline mass by distillation in vacuo. This crystalline residue was redissolved in methylene chloride and chromatographed over 300 g. of Florisil. The column was developed with 100-ml. portions as follows: 10 fractions each of 10%, 15%, and 20% acetone, respectively, in Skellysolve B hexanes. Fractions 13 to 23, eluted with 10% and 15% acetone, represented a peak of 2.91 g. of material, which was recrystallized from acetone-Skellysolve B to give 2.0 g. of white needles of melting point of 227–231° C. representing methyl 3β,16β-dihydroxy-11-keto-5α-trans-17(20)-pregnen-21-oate 3 - acetate. The analysis of this material is as follows:

*Analysis.*—Calcd. for $C_{24}H_{34}O_6$: C, 70.55; H, 8.39. Found: C, 69.15; H, 8.23.

Fractions 26 to 33, inclusive, eluted with 20% acetone in Skellysolve B hexanes represented a peak of 1.14 g. of material, which when recrystallized from acetone-Skellysolve B gave 0.73 g. of white crystalline plates of melting point 182–185° C., representing methyl 3β,16α-dihydroxy - 11 - keto - 5α - cis - 17(20) - pregnen - 21-oate, 3-acetate. Analysis of this material is as follows:

*Analysis.*—Calcd. for $C_{24}H_{34}O_6$: C, 70.55; H, 8.39. Found: C, 70.10; H, 8.43.

EXAMPLE 7.—METHYL 3,11 - DIKETO - 16β - HYDROXY-5α-TRANS-17(20)-PREGNEN-21-OATE, 3-CYCLIC ETHYLENE ACETAL AND METHYL 3,11-DIKETO-16α-HYDROXY - 5α - CIS - 17(20)-PREGNEN - 21 - OATE 3 - CYCLIC ETHYLENE ACETAL

*(1) Preparation of starting materials*

Methyl 3β-hydroxy-11-oxo-5α-cis-17(20)-pregnen - 21-oate (20 g.) was dissolved in 500 ml. of acetone by warming on a steam bath. The solution was cooled to 12° C. with an ice bath and 14.2 ml. of Jones reagent (26.7 g. of chromic anhydride in 23 ml. concentrated sulfuric acid, diluted to 100 ml. with water) was added. The reaction mixture was kept at 15–20° C. for 15 minutes. The mixture was then diluted with 1200 ml. of ice-water and stirred for 45 minutes. The product was filtered by suction and washed 3 times by re-slurrying the material in deionized water and filtering the mixture. After drying to constant weight in vacuo at 40° C., 19 g. of methyl 3,11-diketo-5α-cis-17(20)-pregnen-21 - oate of melting point 238–240° C. was obtained.

Nineteen grams of methyl 3,11-diketo-5α-cis - 17(20)-pregnen-21-oate, as obtained above, were placed in a flask, fitted with a stirrer, a water trap and a reflux condenser. Two hundred milliliters of benzene, 0.5 g. of toluenesulfonic acid monohydrate, and 20 ml. of ethylene glycol were added and the mixture was stirred and refluxed for 6 hours. The mixture was then cooled and diluted with an aqueous 2% sodium bicarbonate solution cooled with ice. The benzene layer was separated and dried over anhydrous sodium sulfate. The dry benzene solution was concentrated by distillation in vacuo to leave a white crystalline residue. The crude residue was recrystallized from ether-Skellysolve B to give 17.34 g. as a first crop and 3 g. as a second crop of methyl 3,11-diketo-5α-cis - 17(20)-pregnen-21-oate, 3-cyclic ethylene acetal. The melting point of this material (first crop) was 169–171° C.

*(2) The 16-hydroxylation*

Five grams of methyl 3,11-diketo-5α-cis-17(20)-pregnen-21-oate, 3-cyclic ethylene acetal was dissolved in 150 ml. of t-butyl alcohol. Five grams of selenium dioxide and 2 g. of sodium acetate was added and the resulting mixture was stirred and refluxed in a nitrogen atmosphere for 7 hours. The reaction mixture was worked up as in Example 6.

The total crude crystalline product thus obtained was chromatographed over 300 g. of Florisil. The column was developed with 100-ml. portions of 10 fractions each of 10%, 15% and 20% acetone, the balance being Skellysolve B hexanes. A peak represented by fractions 12 to 23, inclusive obtained by elution with 10% and 15% acetone in Skellysolve B hexanes, gave 2.35 g. of material which was recrystallized from acetone-Skellysolve B hexanes to give 1.44 g. of methyl 3,11-diketo-16β-hydroxy 5α-trans-17(20)-pregnen-21-oate, 3-cyclic ethylene acetal of melting point 255–258° C. and an analysis as follows:

*Analysis.* — Calcd. for $C_{24}H_{34}O_6$: C, 68.87; H, 8.19. Found: C, 70.21; H, 8.44.

Fractions 26 to 35, inclusive, eluted with 20 ml. of acetone in Skellysolve B hexanes gave 1.4 g. which was recrystallized from the same solvent system to give 1.22 g. of methyl 3,11-diketo-16α-hydroxy-5α-cis - 17(20)-pregnen-21-oate, 3-cyclic ethylene acetal of melting point 214–219° C. and having an analysis as follows:

*Analysis.* — Calcd. for $C_{24}H_{34}O_6$: C, 68.87; H, 8.19. Found: C, 68.62; H, 8.67.

EXAMPLE 8. — METHYL 3-ACETOXY-11-KETO-16-HYDROXY-16-METHYL-CIS-17(20) - PREGNEN-21-OATE AND METHYL 3-ACETOXY-11-KETO-16α-HYDROXY - 16β-METHYL-TRANS - 17(20)-PREGNEN-21-OATE

A mixture was prepared containing 8.7 g. of methyl 3α-acetoxy-11-keto-16α-methyl-cis-17(20)-pregnen-21 - oate, 1.2 ml. of acetic acid and 18 g. of selenium dioxide in 150 ml. of t-butyl alcohol. This mixture was refluxed under nitrogen for 72 hours. After cooling, the insoluble material was removed by filtration through Celite diatomaceous earth and washed with ethyl acetate. The filtrate was evaporated to dryness and the residue dissolved in ethyl acetate. This solution was washed successively with aqueous sodium bicarbonate, ice-cold aqueous ammonium sulfide, ice-cold aqueous dilute ammonia, ice-cold aqueous dilute hydrochloric acid, aqueous soduim bicarbonate solution and water and was thereupon dried over anhydrous sodium sulfate. The dried solution was heated in vacuo to remove the solvent, leaving an oil which was dissolved in methylene chloride and chromatographed on 800 g. of Florisil using gradient elution of Skellysolve B hexanes to 40% acetone:60% Skellysolve B hexanes. The following fractions were thus obtained:

(1) 447 mg. of material which was identical with that of the trans isomer of the starting material, methyl 3α-acetoxy-11-keto-16α-methyl-cis-17(20)-pregnen-21 - oate.

(2) 0.881 g. of material which was triturated with ether and recrystallized from acetone to give 0.55 g. of a material which upon further crystallization from acetone and Skellysolve B hexanes gave material of melting point 195–198° C. and represented 3α-acetoxy-11-keto-16α-hydroxy - 16β-methyl-trans-17(20)-pregnen-21-oate having an analysis as follows:

*Analysis.*—Calcd. for $C_{25}H_{36}O_6$: C, 69.42; H, 8.39. Found: C, 68.83; H, 8.50.

(3) A fraction of 1.002 g., which was triturated with ether and crystallized from acetone and Skellysolve B to give 0.14 g., which upon further crystallization gave material of a melting point of 194–196° C. and is according to its NMR spectrum a 3α-acetoxy-11-keto-16-methyl-16-hydroxy-cis-17(20)-pregnen-21-oate having an analysis as follows:

*Analysis.*—Calcd. for $C_{25}H_{36}O_6$: C, 69.42; H, 8.39. Found: C, 68.75; H, 8.60.

(4) 3.93 g. of material which after recrystallization from methanol gave a material of 2.249 g. of melting point 180–185° C. This material had the following analysis:

*Analysis.*—Found: C, 57.63; H, 7.14. Repeat: C, 57.36; H, 7.11.

The compound had the following infrared data:

$\lambda_{max.}^{Nujol}$, 3630, 3570, 3470, 1740, 1720, 1700, 1660, 1235, 1195, 1175, 1075, 1030, 1020 cm.$^{-1}$ The nuclear magnetic resonance showed that the compound had a cis structure and that the methyl group on the 16-carbon atom is a t-methyl group. The nuclear magnetic resonance further suggested that the 16-hydroxy group was etherified so as to form an O-methyl radical.

In the same manner given in Examples 1 through 7, other alkyl 17(20)-pregnen-21-oates in cis or trans forms can be hydroxylated in the 16-position by the use of selenium dioxide in a suitable solvent or suspending agent. If the starting material has besides a saturated 1,2-carbon linkage a 3-keto-$\Delta^4$-moiety in the A-ring, the reaction with selenium dioxide will simultaneously introduce with 16-hydroxylation a 1,2-double bond. Among suitable starting materials are found alkyl 3,11-diketo-cis-4,17(20)-pregnadien-21-oate, which may have additional substituents in positions 2, 6, 9, 14, 15 or 16, such as halo atoms or alkyl groups like methyl, ethyl, propyl, and the like. Similarly, 3-ketals and 3-acetals, 3-hydroxy and 3-acetoxy, 17,20-pregnen-21-oate esters in cis and trans form and substituted in positions such as 11-keto, 2-methyl, 2-fluoro, 6-methyl, 6-fluoro, 14-hydroxy, 15-methyl, halo, or hydroxy, starting materials may be converted to the 16-hydroxy derivatives according to the reaction shown in Examples 1–7.

Among the alkyl 17(20)-pregnen-21-oate starting materials in cis or trans form, which can be 16-hydroxylated with selenium dioxide, belong the ethyl, propyl, butyl, t-butyl, pentyl, isopentyl, hexyl, 2,2-dimethylbutyl 17(20)-pregnen-21-oates, produced by treating a selected 21,21 - dihalo - 21-ethoxyoxalyl-or 2,21,21-trihalo-2,21 - diethoxyoxalyl - 20 - ketopregnane compound with a selected alkali alkoxide, e.g., sodium ethoxide, potassium t-butoxide, sodium propoxide, and the like, and if necessary dihalogenating with zinc and acetic acid to remove the 2-halo substituent (cf. 2,774,776 and 2,790,814).

Representative alkyl 16-hydroxy-17(20)-pregnene-21-oates obtained from such starting materials by treatment with selenium dioxide, as shown in Examples 1 through 7, include:

(1) Ethyl 16α - hydroxy - 3,11-diketo-cis-1,4,17(20)-pregna-trien-21-oate;
(2) t-Butyl 16α - hydroxy-3,11-diketo-cis-1,4,17(20)-pregnatrien-21-oates;
(3) Propyl 16α - hydroxy-3,11-diketo-cis-1,4,17(20)-pregnatrien-21-oate;
(4) Butyl 16β - hydroxy-3,11-diketo-trans-1,4,17(20)-pregnatrien-21-oate;
(5) t-Butyl 16β-hydroxy-3,11-diketo-trans-1,4,17(20)-pregnatrien-21-oate;
(6) Ethyl 5α,16β - dihydroxy - 6β-methyl-3,11-diketo-trans-17(20)-pregnen-21-oate 3-cyclic ethylene acetal;
(7) Propyl 5α,16β - dihydroxy-6β-methyl-3,11-diketo-trans-17(20)-pregnen-21-oate 3-cyclic ethylene acetal;
(8) t-Butyl 5α,16β - dihydroxy-6β-methyl-3,11-diketo-trans-17(20)-pregnen-21-oate 3-cyclic ethylene acetal;
(9) Propyl 5α,16β - dihydroxy-6β-fluoro-3,11-diketo-trans-17(20)-pregnen-21-oate 3-cyclic ethylene acetal;
(10) t-Butyl 5α,16β - dihydroxy-6β-fluoro-3,11-diketo-trans-17(20)-pregnen-21-oate 3-cyclic ethylene acetal;
(11) Isopentyl 5α,16β-dihydroxy-6β-fluoro-3,11-diketo-trans-17(20)-pregnen-21-oate 3-cyclic ethylene acetal;
(12) Hexyl 5α,16β - dihydroxy - 6β-fluoro-3,11-diketo-trans-17(20)-pregnen-21-oate 3-cyclic ethylene acetal;
(13) Ethyl 3β,16β-dihydroxy-11-keto-5α-trans-17(20)-pregnen-21-oate 3-acetate;
(14) Propyl 3β,16β-dihydroxy-11-keto-5α-trans-17(20)-pregnen-21-oate 3-acetate;
(15) 2,2-Dimethylbutyl 3β,16β-dihydroxy-11-keto-5α-trans-17(20)-pregnen-21-oate 3-acetate;
(16) t-Butyl 3β,16β - dihydroxy - 11 - keto-5α-trans-17(20)-pregnen-21-oate 3-acetate;
(17) Pentyl 3β,16β - dihydroxy - 11 - keto-5α-trans-17(20)-pregnen-21-oate 3-acetate; and the like.

Hydrolysis of the thus-produced alkyl 16-hydroxy-17(20)-pregnen-21-oates with an alkali hydroxide, sodium or potassium bicarbonate in aqueous-alcoholic solution, followed by treatment with the stoichiometrically calculated amount of acid (dissolved in aqueous alcohol), gives the free steroid 21-carboxylic acids, e.g.

16α-hydroxy-3,11-diketo-cis-1,4,17(20)-pregnatrien-21-oate;
16β-hydroxy-3,11-diketo-trans-1,4,17(20)-pregnatrien-21-oate;
5α,16β-dihydroxy-6β-methyl-3,11-diketo-trans-17(20)-pregnen-21-oate, 3-cyclic ethylene acetal;
5α,16α-dihydroxy-6β-methyl-3,11-diketo-cis-17(20)-pregnen-21-oate, 3-cyclic ethylene acetal;
5α,16α-dihydroxy-6β-fluoro-3,11-diketo-trans-17(20)-pregnen-21-oate 3 cyclic ethylene acetal;
3β,16β-dihydroxy-11-keto-5α-trans-17(20)-pregnen-21-oate;
3β,16α-dihydroxy-11-keto-5α-cis-17(29)-pregnen-21-oate;

and the like.

Esterification of such compounds with anhydrides of organic acids in pyridine solution or with formic acid in conventional manner yield the 16-esters, or respectively 3- and 16-diesters of the above compounds. Useful anhydrides include acetic, propionic, butyric, valeric, hexanoic, benzoic, phenylacetic, phenylproprionic anhydrides and the like. Representative esters thus obtained are: the 16α- and 16β-acetate, propionates, butyrates, valerates, hexanoates, benzoates, phenylacetates, phenylpropionates of 16α-hydroxy-3,11-diketo-cis-1,4,17(20)-pregnatrien-21-oate;
16β-hydroxy-3,11-diketo-trans-1,4,17(20)-pregnatrien-21-oate;
5α,16β-dihydroxy-6β-methyl-3,11-diketo-trans-17(20)-pregnen-21-oate, 3-cyclic ethylene acetal;
5α,16α-dihydroxy-6β-methyl-3,11-diketo-cis-17(20)-pregnen-21-oate, 3-cyclic ethylene acetal;
5α,16α-dihydroxy-6β-fluoro-3,11-diketo-trans-17(20)-pregnen-21-oate, 3-cyclic ethylene acetal;

and the 3,16-diacetates, -dipropionate, -dibutyrate, -divalerate, -dihexanoate, -dibenzoate, -diphenylacetate, -diphenylpropionate and the like of 3β,16β-dihydroxy-11-keto-5α-trans-17(20)-pregnen-21-oate; and
3β,16α-dihydroxy-11-keto-5α-cis-17(20)-pregnen-21-oate, and the like.

In the same manner as given in Example 1, methyl 3, 11-diketo-6α-methyl - cis-4,17(20) - pregnadien-21-oate (U.S. Patent 2,968,655) was treated with selenium dioxide in t-butyl alcohol at reflux temperature to give methyl 16β-hydroxy-3,11-diketo-6α-methyl - trans-1,4,17 (20)-pregnatrien-21-oate and methyl 16α-hydroxy-3,11-diketo-6α-methyl-cis-1,4,17(20)-pregnatrien-21-oate.

In the same manner as above, methyl 16β-hydroxy-3, 11-diketo-6α-fluoro - trans-1,4,17(20)-pregnatrien-21-oate and methyl 16α-hydroxy-3,11-diketo-6α-fluoro - cis-1,4,17 (20)-pregnatrien-21-oate were prepared from methyl 3, 11-diketo-6α-fluoro-cis-4,17(20)-pregnadien-21-oate.

EXAMPLE 9.—METHYL 3,11,16-TRIKETO-TRANS-1,4,17(20)-PREGNATRIEN-21-OATE

One gram of methyl 3,11-diketo-16β-hydroxy-trans-1, 4,17(20)-pregnatrien-21-oate was oxidized in 15 ml. of chromium trioxide pyridine complex. The chromium trioxide pyridine complex was produced by dissolving 1 g. of chromium trioxide in 20 ml. of pyridine. After 18 hours at room temperature, isolation of the product was effected by adding toluene and recovering the insoluble material by filtration. The filtered solid was washed with toluene and water. The toluene extract was washed with water and the toluene washings and extracts were combined, dried over anhydrous sodium sulfate, and the solvent removed in vacuo. The crystalline residue thus obtained was triturated with ether and recrystallized from acetone:Skellysolve B hexanes to give 0.44 g. of methyl 3,11,16 - triketo - trans-1,4,17(20) - pregnatrien-21-oate which after further crystallization from methanol had a melting point of 290–293° C. and an analysis:

*Analysis.*—Calculated for $C_{22}H_{24}O_5$: C, 71.72; H, 6.57. Found: C, 72.03; H, 6.84.

$\lambda_{max}^{EtOH}$ 238 m$\mu$, $\epsilon$ 20,850

EXAMPLE 10.—METHYL 3,11,16-TRIKETO-TRANS-1,4,17(20)-PREGNATRIEN-21-OATE

In the same manner as in Example 8, 0.94 g. of methyl 3,11-diketo-16α-hydroxy-1,4,17(20) - pregnatrien-21-oate was oxidized with chromium trioxide in pyridine solution to give 0.31 g. of methyl 3,11,16-triketo-trans-1,4,17(20)-pregnatrien-21-oate having the same physical constants as the products obtained in Example 8 from the 16β-starting material.

EXAMPLE 11.—METHYL 3,11,16-TRIKETO-CIS-1,4,17(20)-PREGNATRIEN-21-OATE

In the same manner given in Example 9, methyl 3,11-diketo-16α-hydroxy - cis-1,4,17(20) - pregnatrien-21-oate was oxidized with the chromium trioxide pyridine complex. The product was isolated as in Example 9 by extraction with toluene and after evaporation of the toluene the crude product obtained was dissolved in 15 ml. of methylene chloride and chromatographed over 200 g. of Florisil anhydrous magnesium silicate with a gradient elution from Skellysolve B hexanes to 40% acetone:60% Skellysolve B hexanes. Two main peaks were obtained:

(A) The first elute (0.761 g.) was recrystallized from ether and thereupon twice from methanol to give methyl 3,11,16-triketo - cis - 1,4,17(20) - pregnatrien-21-oate of melting point 170–172° C. and analysis as follows:

*Analysis.*—Calculated for $C_{22}H_{24}O_5$: C, 71.72; H, 6.57. Found: C, 71.03; H, 7.18.

(B) The second elute consisted of 0.087 g., had the infrared spectrum of the trans isomer of the eluate A and was therefore considered to be methyl 3,11,16-triketo-trans-1,4,17(20)-pregnatrien-21-oate.

EXAMPLE 12.—METHYL 5α - HYDROXY - 6β - FLUORO-3,11,16-TRIKETO - CIS - 17(20)-PREGNEN-21-OATE, 3-CYCLIC ETHYLENE ACETAL

A solution was prepared containing 25 g. of methyl 5α,16α-dihydroxy - 6β - fluoro - 3,11 - diketo-cis-17(20)-pregnen-21-oate, 3-cyclic ethylene acetal in 1600 ml. of ethyl acetate. To this solution was added 70 g. of activated manganese dioxide and the mixture was shaken at room temperature for a period of 24 hours.

Thereafter, the mixture was filtered through a 2-inch thick pad of Celite diatomaceous earth, the filter cake was rinsed with 200 ml. of hot ethyl acetate. If some of the manganese dioxide should pass through the filter, a second filtration is indicated. The thus-obtained ethyl acetate solution and washings are concentrated by distillation in vacuo until crystallization starts. At this point the distillation is stopped, the remaining solution is heated to near boiling at atmospheric pressure, and 300 ml. of hot Skellysolve B hexanes are added. The mixture is then cooled in a refrigerator to about 10° C. and thereupon filtered. The product remaining on the filter is dried until constant weight is obtained: A total of 21.7 g. of melting point 180–182° C. of methyl 5α-hydroxy-6β-fluoro-3,11,16-triketo-cis-17(20)-pregnen-21-oate, 3-cyclic ethylene acetal. The analysis of this material is as follows:

*Analysis.*—Calcd. for $C_{24}H_{31}O_7F$: C, 63.98; H, 6.93; F, 4.21. Found: C, 64.24; H, 7.20; F, 3.73.

A second crop from the filtrate amounted to 1 g. of material of melting point 174–177° C.

EXAMPLE 13.—5α-HYDROXY-6β-METHYL-11,16-DIKETO-CIS-17(20)-PREGNEN-21-OATE, 3-CYCLIC ETHYLENE ACETAL

In the same manner as given in Example 12, methyl 5α,16α - dihydroxy - 6β - methyl - 3,11 - diketo-cis-17(20)-pregnen-21-oate, 3-cyclic ethylene acetal was oxidized with manganese dioxide to give methyl 5α-hydroxy-6β-methyl - 3,11,16 - triketo - cis - 17(20) - pregnen-21-oate, 3-cyclic ethylene acetal.

In the same manner given in Example 9, other 16α-hydroxy-17(20)-pregnen-21-oates can be oxidized to the corresponding 16-keto compounds. Representative starting materials for this oxidation include methyl 3β,16α-dihydroxy-11-keto-5α-cis-17(20)-pregnen-21-oate, 3-acetate to give the corresponding methyl 3β-hydroxy-11,16-diketo-5α-cis-17(20) - pregnen - 21 - oate, 3-acetate and methyl 3,11 - diketo-16α-hydroxy-5α-cis-17(20)-pregnen-21-oate, 3-cyclic ethylene acetal to give the corresponding methyl 3,11,16 - triketo - 5α-cis-17(20)-pregnen-21-oate, 3-cyclic ethylene acetal.

EXAMPLE 14.—METHYL 3,11 - DIKETO - 16β - HYDROXY-CIS-1,4,17(20)-PREGNATRIEN-21-OATE

Two grams of methyl 3,11,16-triketo-cis-1,4,17(20)-pregnatrien-21-oate was dissolved in 35 ml. of tetrahydrofuran. To this solution was added 0.3 g. of lithium tri-t-butoxyaluminum hydride in 30 ml. of tetrahydrofuran freshly passed over alumina. This material was stirred for 2 hours at room temperature in a three-necked flask fitted with drying tube and stirrer. The mixture was thereupon cooled to 5° C. with an ice-salt bath and thereto was added to 2.5 ml. of acetic acid, dropwise over a period of 2 to 3 minutes, to decompose the excess of reducing agent. Thereafter 2.5 ml. of 5% sodium bicarbonate solution was added and the mixture was filtered through a pad of Celite diatomaceous earth. The residue remaining on the filter was rinsed with 40 ml. of methylene chloride and the methylene chloride solution was combined with the filtrate. The mixture was washed with 400 ml. of deionized water, the deionized water was then separated from the heavier organic layer and the organic layer was twice more washed with 30-ml. portions of water and finally dried over anhydrous sodium sulfate. The dry extract was then concentrated by distillation in vacuo to give a solid which was dissolved in 20 ml. of acetone. Thereto was added 20 ml. of hot Skellysolve B hexanes and the mixture was then cooled to about 10° C. Some white crystalline product precipitated from the solution and was collected on a filter. These white crystalline materials were dried to constant weight to give methyl 3,11-diketo-16β-hydroxy-cis-1,4,17(20)-pregnatrien-21-oate.

EXAMPLE 15.—METHYL 5α,16β-DIHYDROXY-6β-FLUORO - 3,11 - DIKETO - CIS-17(20)-PREGNEN-21-OATE, 3-CYCLIC ETHYLENE ACETAL.

Twenty grams of methyl 3,11,16-triketo-5α-hydroxy-6β-fluoro-17(20)-pregnen-21-oate, 3-cyclic ethylene acetal were dissolved in 320 ml. of tetrahydrofuran. The tetrahydrofuran had been freshly passed over a good grade of alumina (Fisher adsorption alumina), discarding the first 7.5% of the tetrahydrofuran. To this solution, contained in a 1 liter, three-necked flask, fitted with drying tube and stirrer, was added 260 ml. of tetrahydrofuran containing 2.64 g. of lithium tri-t-butoxyaluminum hydride. The flask was thereupon stoppered to protect it from atmospheric moisture and the mixture stirred for 2 hours at room temperature. The mixture was then cooled to 5° C. with an ice-salt bath and thereto was added 25 ml. of 3% acetic acid in small portions, over a period of 2 to 3 minutes to decompose the excess reducing agent. Thereafter, 25 ml. of 5% sodium bicarbonate solution in water was added and the precipitated solids were filtered on a pad of Celite diatomaceous earth filter. The resulting residues on the filter were rinsed with 400 ml. of methylene chloride. The filtrate was treated with 400 ml. of deionized water, shaken and the heavier organic layer separated. The organic layer was then twice washed with 300-ml. portions of water and the extracts dried over anhydrous sodium sulfate. The extract was then distilled in vacuo until a dry solid was obtained whereupon 0.5 ml. of pyridine (to stabilize the acetal) and 200 ml. of warm acetone were added. After all solids were dissolved, 200 ml. of hot Skellysolve B hexanes were added and the mixture cooled to about 10° C. The white crystalline product thus obtained was recovered on a filter and dried to constant weight. The first yield was 16.71 g. of material melting at 252–256° C., a second crop was 1.12 g. and melted at 240–248° C. The first crop was pure methyl 3,11 - diketo - 5α,16β - dihydroxy - 6β - fluoro-cis-17(20)-pregnen-21-oate having an analysis as follows:

Analysis.—Calcd. for $C_{24}H_{34}O_7F$: C, 63.70; H, 7.35; F, 4.20. Found: C, 63.27; H, 7.13; F, 4.30. λmax. 225, ε10,450/$C_2H_5OH$ In the same manner given in Example 14, other 16-keto-17(20)-pregnen-21-oate esters are reduced to the corresponding 16β-hydroxy steroids with lithium tri-t-butoxyaluminum hydride or other lithium trialkoxyaluminum hydride without simultaneous reduction of other carbonyl groups, double bonds, or the like. Other representative starting materials for this reduction are: Methyl 3, 11,16-triketo - trans - 1,4,17(20)-pregnatrien-21-oate; methyl 3β-hydroxy - 11,16 - diketo-5α-trans-17(20)-pregnen-21-oate, 3 - acetate; methyl 3,11,16-triketo-5α-cis-17(20)-pregnen-21-oate, 3-cyclic ethylene acetal; methyl 5α-hydroxy - 6β-methyl 3,11,16 - triketo - trans-17(20)-pregnen-21-oate, 3-cyclic ethylene acetal; methyl 5α-hydroxy-6β-methyl-3,11,-16 - triketo - cis-17(20)-pregnen-21-oate, 3-cyclic ethylene acetal, and the like.

When these compounds were treated with lithium tri-t-butoxyaluminum hydride there was obtained methyl 3,11 - diketo - 16β - hydroxy-trans-1,4,17(20)-pregnatrien-21 - oate, methyl 3β,16β - dihydroxy - 11 - keto - 5α - trans-17(20)-pregnen-21-oate, 3-acetate, methyl 3,11-diketo-16β-hydroxy-5α-cis-17(20)-pregnen-21-oate, 3-cyclic ethylene acetal, methyl 5α,16β-dihydroxy-6β-methyl-3-11-diketo-trans(and cis)-17(20)-pregnen-21-oate, 3-cyclic ethylene acetal, and the like.

An alternate method to convert 16α-hydroxy-17(20)-pregnene compounds to the corresponding 16β-hydroxy-17(20)-pregnene compounds is as follows:

EXAMPLE 16.—METHYL 16β - HYDROXY-3,11 - DI-KETO-CIS-1,4,17(20)-PREGNATRIEN-21-OATE

A solution of methyl 16α-hydroxy-3,11-diketo-cis-1,4,-17(20)-pregnatrien-21-oate (1.05 g.) in 25 ml. of pyridine was cooled to 0° C. in an ice-salt bath. Thereupon 2 ml. of methanesulfonyl chloride was added dropwise. The reaction was allowed to proceed for 18 hours at 0–5° C. Thereafter the reaction mixture was poured into ice water and the solid thus produced collected by filtration. After washing the precipitate with water, the crude methanesulfonate was dried in vacuo, then dissolved in methylene chloride and chromatographed on 270 g. of silica; fractions were made with a solution containing 75% acetate; 25% cyclohexane. A main crystalline peak was obtained which yielded 0.985 g. of crude methanesulfonate. This was recrystallized from acetone and Skellysolve B hexanes to give 0.51 g. of methyl 16α-hydroxy-3,11-diketo-cis-1,4,17(20)-pregnatrien-21-oate 16-methanesulfonate of melting point 169–170° C. (dec.). After two further crystallizations from acetone-Skellysolve B hexanes mixture the compound had a melting point of 170–172° C. and an analysis as follows:

Analysis.—Calcd. for $C_{23}H_{28}O_7S$: C, 61.60; H, 6.25; S, 7.14. Found: C, 61.51; H, 6.61; S, 7.15.

To a solution of 2.7 g. of methyl 16α-hydroxy-3,11-diketo - cis - 1,4,17(20) - pregnatrien-21-oate, 16-methanesulfonate in 90 ml. of methyl ethyl ketone was added 8.1 g. of tetrabutylammonium acetate. The mixture was then stirred for 2½ hours at room temperature. At the end of this period the mixture was heated to boiling under reflux for 30 minutes. The excess solvent was then removed in vacuo. The residue was partitioned between methylene chloride and water. After further extraction of the aqueous layer with methylene chloride, the organic layer was washed with water, dried over anhydrous sodium sulfate and the solvent evaporated to dryness in vacuo. The residue was dissolved in methylene chloride and adsorbed on 35 g. of silica (Merck G). This solid was then applied to a 300 g. column of silica (Merck G) made up in 75% ethyl acetate:25% cyclohexane. The main peak contained 2.498 g., which was crystallized from acetone:Skellysolve B hexanes to give 1.88 g. of methyl 16β - hydroxy - 3,11-diketo-cis-1,4,17(20)-pregnatrien-21-oate 16-acetate of melting point 195–198° C. Further recrystallization from acetone:Skellysolve B hexanes gave material of melting point 196–200° C. and of the following analysis:

Analysis.—Calcd. for $C_{24}H_{28}O_6$: C, 69.88; H, 6.84. Found: C, 69.89; H, 6.94.

A solution of 1.401 g. of methyl 16β-hydroxy-3,11-diketo - cis - 1,4,17(20)-pregnatrien-21-oate, 16-acetate in 130 ml. of methanol was prepared by heating. After cooling a solution of 39.2 ml. of aqueous sodium bicarbonate (prepared from 11.2 ml. saturated aqueous sodium bicarbonate solution and 48 ml. of water) was added and the homogeneous solution stirred for 18 hours at room temperature. At the end of this period water and methylene chloride were added and the organic material was carefully extracted with additional methylene chloride. The combined methylene chloride extracts were washed with water, dried over anhydrous sodium sulfate and evaporated to dryness in vacuo. The resulting residue (1.278 g.) was crystallized from acetone:Skellysolve B hexanes to give one crop of 0.92 g. of material of melting point 244–246° C. and a second crop of 0.25 g. of melting point 238–241° C. A further crystallization of the first crop from acetone:Skellysolve B gave pure methyl - 16β - hydroxy - 3,11 - diketo-cis-1,4,17(20)-pregnatrien-21-oate of melting point 245–247° C. and an analysis as follows:

Analysis.—Calcd. for $C_{22}H_{26}O_5$: C, 71.33; H, 7.08. Found: C, 71.22; H, 7.26.

In the same manner as given in Example 16, other 16α-hydroxy-17(20)-pregnen-21-oic acid esters can be converted to the corresponding 16β-hydroxy-17(20)-pregnen-21-oic acid esters by converting the 16α-hydroxy steroid first to its methane- or toluenesulfonate with methane- or toluenesulfonyl chloride to obtain the corresponding 16α-hydroxy steroid sulfonic acid ester and treating this ester with a salt of a hydrocarbon carboxylic acid, preferably with an acetate such as potassium, sodium acetate or a quaternary ammonium acetate such as tetramethyl, tetraethyl, tetrabutyl ammonium acetates to obtain the corresponding 16β-hydroxy-17(20)-pregnen-21 - oic acid alkyl ester, 16-acetylate, which upon hydrolysis in a mild alkaline solution gives the corresponding 16β-hydroxy steroid, unesterified in the 16-position. Other starting materials include: methyl 16α-hydroxy-3,11-diketo-trans-1,4,17(20)-pregnatrien-21-oate; methyl 5α,16α-dihydroxy-6β-methyl-3,11-diketo-cis-17(20)-pregnen-21-oate, 3-cyclic ethylene acetal, methyl 5α,16α-dihydroxy-6β-fluoro-3,11-diketo-cis-17(20)-pregnen-21-oate; methyl 3β,16α-dihydroxy - 11-keto-5α-cis-17(20)-pregnen-21-oate, 3-acetate; methyl 3, 11-diketo-16α-hydroxy-5α-trans-17(20)-pregnen-21 - oate, 3-cyclic ethylene acetal, and the like.

EXAMPLE 17.—METHYL 16β-FLUORO - 3,11 - DI-KETO-CIS-1,4,17(20)-PREGNATRIEN-21-OATE

A solution of 1.27 g. of methyl 16α-hydroxy-3,11-diketo-cis-1,4,17(20)-pregnatrien - 21 - oate in 20 ml. of methylene chloride was allowed to stir at room temperature with N-(2-chloro-1,1,2-trifluoroethyl)-diethylamine (3 ml.). After 3 hours at room temperature the reaction mixture was poured into ice water. The organic layer was washed with sodium bicarbonate solution, water and dried over anhydrous sodium sulfate. The solvent was thereupon removed by distillation in vacuo to give crystalline material which was dissolved in methylene chloride and chromatographed over 200 g. of Florisil using gradient elution of Skellysolve B hexanes to 30% acetone:Skellysolve B hexanes. This gave a main fraction of 1.049 g., which was recrystallized from acetone:Skellysolve B hexanes to give 0.72 g. of methyl 16β-fluoro-3,11-diketo-cis-1,4,17(20)-pregnatrien-21-oate of melting point 205–209° C. Further recrystallization from acetone:Skellysolve B hexanes gave material which melted between 208–211° C. and corresponded to an analysis as follows:

*Analysis.*—Calcd. for $C_{22}H_{25}O_4F$: C, 70.98; H, 6.72; F, 5.11. Found C, 71.00; H, 6.86; F, 4.91.

$\lambda_{max}^{EtOH}$ 230 mμ, ε22,100

EXAMPLE 18.—METHYL 16β-FLUORO - 3,11 - DIKETO-TRANS-1,4,17(20)-PREGNATRIEN-21-OATE

A solution of 1.1 g. of 16α-hydroxy-3,11-diketo-trans-1,4,17(20)-pregnatrien-21-oate in 15 ml. of methylene dichloride was reacted with 2.1 ml. of N-(2-chloro-1,1,2-trifluoroethyl)-diethylamine for 3 hours at room temperature. After chromatography and crystallization from acetone:Skellylsolve B hexanes 0.78 g. of methyl 16β-fluoro-3,11-diketo-trans-1,4,17(20)-pregnatrien-21-oate was obtained of melting point 146–149° C. After further crystallization from acetone:Skellysolve B hexanes, the melting point was 151–153° C. and the material had an analysis as follows:

*Analysis.*—Calcd. for $C_{22}H_{25}O_4F$: C, 70.98; H, 6.72; F, 5.11. Found: C, 70.54; H, 7.16; F, 4.45.

EXAMPLE 19.—METHYL 16α-FLUORO - 3,11 - DIKETO-TRANS-1,4,17(20)-PREGNATRIEN-21-OATE

A solution of 1.2 g. of methyl 16β-hydroxy-3,11-diketo-trans-1,4,17(20)-pregnatrien-21-oate in 15 ml. of methylene chloride was treated with 3 ml. of N-(2-chloro-1,1,2-trifluoroethyl)-diethylamine. The mixture was allowed to stand at room temperatures for a period of 3 hours and was thereafter chromatographed and crystallized from acetone:Skellylsolve B hexanes, like in Example 17. 0.95 g. of material was obtained having a melting point of 189–192° C. which was further crystallized from acetone:Skellysolve B hexanes to give pure methyl 16α-fluoro-3,11-diketo-trans-1,4,17(20)-pregnatrien-21-oate of melting point 195–198° C. and analysis as follows:

*Analysis.*—Calcd. for $C_{22}H_{25}O_4F$: C, 70.98; H, 6.72; F, 5.11. Found: C, 70.17; H, 6.66; F, 4.97.

EXAMPLE 20.—METHYL 16α-FLUORO - 3β - HYDROXY-11-KETO-5α-TRANS-17(20) - PREGNEN-21-OATE, 3-ACETATE

A solution of 1 g. of methyl 3β,16β-dihydroxy-11-keto-5α-trans-17(20)-pregnen-21-oate, 3-acetate in 15 ml. of methylene dichloride was reacted with N-(2-chloro-1,1,2-trifluoroethyl)-diethylamine. The mixture was allowed to stand at room temperature for 2½ hours. Thereafter, the reaction mixture was poured into ice water and worked up as in Example 17 using 1:1 mixtures of acetone and Skellysolve B hexanes for crystallization. After the first crystallization 0.56 g. of material were obtained having a melting point of 214–216° C. Further crystallization gave pure methyl 3β-hydroxy-11-keto-16α-fluoro-5α-trans - 17 (20)-pregnen-21-oate, 3-acetate of melting point 233–234° C. having an analysis as follows:

*Analysis.*—Calcd. for $C_{24}H_{33}O_5F$: C, 68.58; H, 7.86; F, 4.52. Found: C, 68.24; H, 7.37; F, 4.28.

EXAMPLE 21. — METHYL 3β-HYDROXY-11-KETO-16β-FLUORO-5α-CIS - 17(20)-PREGNEN-21-OATE 3-ACETATE

Otherwise as in Example 20, 0.88 g. of methyl 3β-acetoxy-11-keto-16α-hydroxy-5α-cis-17(20)-pregnen-21 - oate was allowed to stand at room temperature in 15 ml. of methylene chloride and 3 ml. of N-(2-chloro-1,1,2-trifluoroethyl)-diethylamine. After 2¼ hours, the mixture was poured into ice water, the material extracted and recrystallized repeatedly from ether and acetone: Skellysolve B hexanes to give methyl 3β-hydroxy-16β-fluoro-11-keto- 5α-cis-17(20)-pregnen-21-oate 3-acetate of melting point 126–129° C. and an analysis as follows:

*Analysis.*—Calcd. for $C_{24}H_{33}O_5F$: C, 68.58; H, 7.86; F, 4.52. Found: C, 68.90; H, 8.23; F. 4.54.

EXAMPLE 22. — METHYL 5α-HYDROXY-6β,16α-DIFLUORO-3,11-DIKETO-TRANS-17(20)-PREGNEN-21-OATE, 3-CYCLIC ETHYLENE ACETAL

To a solution of 13.6 g. of methyl 5α,16β-dihydroxy-6β-fluoro-3,11-diketo-trans-17(20)-pregnen-21-oate 3-cyclic ethylene acetal in 550 ml. of methylene chloride at ice bath temperature was added 13.6 ml. of N-(2-chloro-1,1,2-trifluoroethyl)-diethylamine. After standing at 5° C. for 3½ hours, the reaction mixture was washed with sodium bicarbonate solution and then with water. The organic layer was dried with anhydrous sodium sulfate and evaporated to dryness. The residual oil was dissolved in the minimum amount of ethylene dichloride, transferred to an evaporating dish and allowed to evaporate to dryness on a steam bath in the hood. The evaporation process was repeated several times until crystals formed. The crystalline residue was crystallized from methanol to give in two crops 12.8 g. (94%) of methyl 5α-hydroxy-6β,16α-difluoro - 3,11 - diketo-trans-17(20)-pregnen-21-oate, 3-cyclic ethylene acetal of melting point 204–216° C. This material was recrystallized from methyl alcohol to give pure methyl 5α-hydroxy-6β,16α-difluoro-3,11-diketo-trans-17(20)-pregnen-21-oate, 3-cyclic ethylene acetal of melting point 207–210° C.; rotation $[\alpha]_D$ −24° in acetone and an analysis as follows:

*Analysis.*—Calcd. for $C_{24}H_{32}O_6$: C, 63.42; H, 7.10; F, 8.36. Found: C, 63.36; H, 7.27; F, 7.86.

EXAMPLE 23. — METHYL 5α-HYDROXY-6β,16β-DIFLUORO-3,11-DIKETO-CIS - 17(20)-PREGNEN-21-OATE, 3-CYCLIC ETHYLENE ACETAL

In the same manner described in Example 20, 5.96 g. of methyl 5α,16α-dihydroxy-6β-fluoro-3,11-diketo-cis-17 (20)-pregnen-21-oate, 3-cyclic ethylene acetal was reacted with N-(2-chloro-1,1,2 - trifluoroethyl)-diethylamine (6 ml.) to give 4.98 g. of material melting at 210–218° C. which was recrystallized from methanol to give pure methyl 5α - hydroxy - 6β,16β-difluoro-3,11-diketo-cis-17 (20)-pregnen-21-oate, 3-cyclic ethylene acetal of melting point 212–215° C.; rotation $[\alpha]_D$ +38° (acetone) and an analysis as follows:

*Analysis.*—Calcd. for $C_{24}H_{32}F_2O_6$: C, 63.42; H, 7.10; F, 8.36. Found: C, 63.11; H, 7.10; F, 8.47.

EXAMPLE 24. — METHYL 5α-HYDROXY-6β-METHYL - 16α - FLUORO - 3,11 - DIKETO - TRANS - 17 (20)-PREGNEN-21-OATE, 3-CYCLIC ETHYLENE ACETAL

In the same manner as in Example 20, 12.9 g. of 5α, 16β-dihydroxy-6β-methyl-3,11-diketo-trans - 17(20)-pregnen-21-oate, 3-cyclic ethylene acetal, upon treatment with N-(2-chloro-1,1,2-trifluoroethyl)-diethylamine, gave 10 g. of material melting at 199–200° C., which upon recrystallization from methanol melted at 199–202° C. and had an analysis as follows:

*Analysis.*—Calcd. for $C_{25}H_{35}O_6F$: C, 66.64; H, 7.83; F, 4.42. Found: C, 66.22; H, 8.07; F, 4.37.

This material was the desired methyl 5α-hydroxy-6β-methyl-16α-fluoro-3,11-diketo-trans-17(20) - pregnen-21-oate, 3-cyclic ethylene acetal.

EXAMPLE 25.—METHYL 5α-HYDROXY-6β-METHYL-16β-FLUORO-3,11-DIKETO-CIS - 17(20)-PREGNEN-21-OATE, 3-CYCLIC ETHYLENE ACETAL

In the same manner given in Example 20, 4.88 g. of methyl 5α,16α-dihydroxy - 6β - methyl-3,11-diketo-cis-17 (20)-pregnen-21-oate, 3-cyclic ethylene acetal was treated with 5 g. of N-(2-chloro-1,1,2-trifluoroethyl)-diethylamine to give 3.14 g. (64% yield) of material of melting point 197–202° C. which was recrystallized from acetone to give pure methyl 5α-hydroxy-6β-methyl-16β-fluoro-3,11-diketo-cis-17(20)-pregnen-21-oate, 3-cyclic ethylene acetal of melting point 193–195° C. and an analysis as follows:

*Analysis.*—Calcd. for $C_{25}H_{35}O_6F$: C, 66.64; H, 7.83; F, 4.42. Found: C, 66.76; H, 8.12; F, 4.15.

EXAMPLE 26.—METHYL 5α-HYDROXY-6β,16α-DIFLUORO - 3,11 - DIKETO-TRANS - 17(20)-PREGNEN-21-OATE, 3-CYCLIC ETHYLENE ACETAL

To a solution of 50 g. of methyl 5α,16β-dihydroxy-6β-fluoro-3,11-diketo-trans-17(20)-pregnen-21-oate, 3-cyclic ethylene acetal in 1000 ml. of methylene chloride at ice-bath temperature was added 50 ml. of pre-cooled (to 5° C.) N - (2 - chloro - 1,1,2 - trifluoroethyl) - diethylamine. The resulting reaction solution was allowed to stand at 5° C. for 4½ hours and was then diluted with 400 ml. of saturated sodium bicarbonate solution added cautiously with stirring. The organic phase was separated, washed once with saturated sodium bicarbonate solution and three times with water, dried over anhydrous sodium sulfate and evaporated to dryness on the steam bath under a stream of air. The resulting non-crystalline residue was dissolved in a minimum of ethylene dichloride and again evaporated to dryness on the steam bath under a stream of air. This was repeated several times until a crystalline residue was formed. The crystalline residue was dissolved in 300 ml. of methylene chloride and to this solution was added 1200 ml. of methanol. Concentration of the solution on the steam bath to 1000 ml. and cooling gave 34.2 g. of a product melting at 210–214° C. with decomposition. An analytical sample purified by additional recrystallization from methanol gave pure methyl 5α-hydroxy - 6β,16α - difluoro - 3,11 - diketo - trans - 17(20)-pregnen-21-oate, 3-cyclic ethylene acetal of melting point 215–217° C. with decomposition; rotation $[\alpha]_D-24°$ in acetone and the following analysis:

*Analysis.*—Calcd. for $C_{24}H_{32}F_2O_6$: C, 63.42; H, 7.10; F, 8.36. Found: C, 63.36; H, 7.27; F, 8.50.

EXAMPLE 27.—METHYL 5α - HYDROXY - 6β,16α-DIFLUORO - 3,11 - DIKETO - CIS - 17(20) - PREGNEN-21-OATE, 3-CYCLIC ETHYLENE ACETAL

In the same manner given in Example 26, 10 g. of the cis isomer, methyl 5α,16β-dihydroxy-6β-fluoro-3,11-diketo-cis-17(20)-pregnen-21-oate, 3-cyclic ethylene acetal, was converted with N-(2-chloro-1,1,2-trifluoroethyl)-diethylamine to 7.8 g. of methyl 5α-hydroxy-6β,16α-difluoro - 3,11 - diketo - cis - 17(20) - pregnen - 21 - oate, 3-cyclic ethylene acetal which in the crude state had a melting point of 197–204° C. and upon recrystallization from methanol had a melting point of 203–205° C. Rotation of pure methyl 5α-hydroxy-6β,16α-difluoro-3,11-diketo-cis-17(20)-pregnen-21-oate, 3-cyclic ethylene acetal was $[\alpha]_D-17°$ in chloroform; analysis as follows:

*Analysis.*—Calcd. for $C_{24}H_{32}F_2O_6$: C, 63.42; H, 7.10; F, 8.36. Found: C, 63.36; H, 7.38; F, 8.75.

In the same manner as given in Example 20, other 16α- and 16β-fluoro-17(20)-pregnen-21-oate alkyl esters can be produced by reacting 16-hydroxy-17(20)-pregnen-21-oate esters with fluorinating agents selected from N-(2-chloro-1,1,2-trifluoro-ethyl)-dialkylamines. In this reaction the 16α-hydroxy steroids are converted to 16β-fluorosteroids and the 16β-hydroxy steroids are converted to 16α-fluoro steroids.

EXAMPLE 28.—METHYL 16β - CHLORO - 3,11 - DIKETO-CIS-1,4,17(20)-PREGNATRIEN-21-OATE

To a suspension of 1 g. of methyl 16α-hydroxy-3,11-diketo-cis-1,4,17(20)-pregnatrien-21-oate in 15 ml. of methylene chloride was added 2 ml. of N,N-diethyl-1,2,2-trichlorovinylamine. The steroid immediately dissolved upon swirling. After standing at room temperature for 2 hours, the solution was diluted with methylene chloride, washed with cold aqueous sodium bicarbonate solution, dried and evaporated. The gummy residue was chromatographed over 50 g. of Florisil by pouring a benzene solution of the material over the Florisil and extracting with mixtures of acetone and Skellysolve B hexanes. The fractions consisting of 12.5% acetone and 87.5% Skellysolve B hexanes afforded 648 mg. which after recrystallization from acetone:Skellysolve B hexanes had a melting point of 137–140° C. and after further crystallization from dilute methanol gave pure methyl 16β-chloro-3,11-diketo-cis-1,4,17(20)-pregnatrien-21-oate having a melting point of 142–143° C. and an analysis as follows:

*Analysis.*—Calcd. for $C_{22}H_{24}O_4Cl$: C, 68.12; H, 6.24; Cl, 9.14. Found: C, 67.81; H, 6.32 Cl, 8.90.

EXAMPLE 29.—METHYL 5α-HYDROXY-6β-FLUORO - 16β - CHLORO - 3,11 - DIKETO - CIS - 17(20) - PREGNEN-21-OATE, 3-CYCLIC ETHYLENE ACETAL

To a solution of 0.50 g. of methyl 5α,16α-dihydroxy-6β-fluoro-3,11-diketo-cis-17(20)-pregnen-21-oate, 3-cyclic ethylene acetal in 8 ml. of methylene chloride was added 1 ml. of N,N-diethyl-1,2,2-trichlorovinylamine. After standing for 2 hours at room temperature, the solution was diluted with methylene chloride, washed with cold aqueous sodium bicarbonate, dried over anhydrous sodium sulfate and evaporated. The oily residue was dissolved in methylene chloride and chromatographed over 35 g. of Florisil anhydrous magnesium silicate. From the 5% acetone:95% Skellysolve B hexane fractions there was obtained 207 mg. of a partly crystalline product which after recrystallization twice from methanol gave fine needles of methyl 5α-hydroxy-6β-fluoro-16β-chloro-3,11-diketo-cis-17(20)-pregnen-21-oate 3-cyclic ethylene acetal of melting point 195–197° C. with decomposition and an analysis as follows:

*Analysis.*—Calcd. for $C_{24}H_{32}O_6FCl$: C, 61.20; H, 6.85; Cl, 7.53; F, 4.03. Found: Cl, 7.82.

EXAMPLE 30.—METHYL 16α - CHLORO - 3,11 - DIKETO - 5α - TRANS - 17(20) - PREGNEN - 21-OATE, 3-CYCLIC ETHYLENE ACETAL

To a solution of 3.7 g. of methyl 3,11-diketo-16β-hydroxy-5α-trans-17(20)-pregnen-21-oate, 3-cyclic ethylene acetal in 30 ml. of methylene chloride was added 11.1 ml. of N,N-diethyl-1,2,2-trichlorovinylamine. The solution was allowed to stand at room temperature for a period of 3 hours under a nitrogen atmosphere. Thereafter the solution was washed with cold aqueous sodium bicarbonate solution, dried over anhydrous sodium sulfate and evaporated. The oily residue was dissolved in 75 ml. of dry benzene, treated with 300 mg. of toluene-sulfonic acid and 10 ml. of ethylene glycol and heated under reflux using a Dean-Stark water trap. The heating and refluxing was continued for 5 hours. Thereafter, the reaction mixture was cooled, washed with sodium bicarbonate solution, dried over anhydrous sodium sulfate, and evaporated. The oily residue was taken up in benzene and chromatographed over 150 g. of Florisil magnesium silicate. The eluate was collected in 250 ml. fractions using as a solvent system Skellysolve B hexanes to 10% acetone–90% Skellysolve B hexanes gradient over 30 fractions. Fractions 1 through 3 contained oily, chlorinating reagent containing by-products and were discarded. Fractions 7 through 20 contained mostly crystalline residues which by thin layer chromatography on silica gel were found to contain the desired product in good concentration. Fractions 4 through 20 were recombined and rechromatographed on 150 g. of Florisil. The fractions consisting of 2 and 3% acetone:balance Skellysolve B hexanes contained methyl 16α-chloro-3,11-diketo-5α-trans-17(20)-pregnen-21-oate, 3-cyclic ethylene acetal which after recrystallization from acetone Skellysolve B hexanes gave methyl 16α-chloro-3,11-diketo-5α-trans-17(20)-pregnen-21-oate, 3-cyclic ethylene acetal in two crops in the form of needles: 2.04 g. of melting point 207–208° C. and 0.27 g. of melting point 205–208° C., a total of 60% of the theory. The analysis of the thus-obtained methyl 16α-chloro-3,11-diketo-5α-trans-17(20)-pregnen-21-oate, 3-cyclic ethylene acetal was as follows:

*Analysis.*—Calcd. for $C_{24}H_{33}O_5Cl$: C, 65.96; H, 7.61; Cl, 8.12. Found: C, 65.27; H, 7.65; Cl, 8.06.

EXAMPLE 31.—METHYL 16α-CHLORO-3,11-DIKETO-CIS-1,4,17(20)-PREGNATRIEN-21-OATE

A mixture of 575 mg. of methyl 16β-hydroxy-3,11-diketo-cis-1,4,17(20)-pregnatrien-21-oate, 15 ml. of methylene chloride and 1.5 ml. of N,N-diethyl-1,2,2-trichlorovinylamine was stirred at room temperature for a period of 3 hours. The now yellowish solution was washed with sodium bicarbonate solution, water, dried over anhydrous sodium sulfate and evaporated to a partially crystalline, partially oily residue which was purified by means of chromatography over 35 g. of Florisil magnesium silicate. After eluting the oily chlorinating agent residues with acetone in Skellysolve B hexane diluents, the main product, 601 mg., was obtained in the fractions consisting of 10% acetone:90% Skellysolve B hexanes. Recrystallization of these fractions from acetone-Skellysolve B afforded 0.36 g. of methyl 16α-chloro-3,11-diketo-cis-1,4,17(20)-pregnatrien-21-oate of melting point 211–212° C. and 0.11 g. of melting point 206–209° C., a total of 79% yield, having an analysis as follows:

*Analysis.*—Calcd. for $C_{22}H_{25}O_4Cl$: C, 67.94; H, 6.48; Cl, 9.12. Found: C, 68.07; H, 6.61; Cl, 9.09.

EXAMPLE 32.—METHYL 5α-HYDROXY-6β-METHYL - 16α - CHLORO - 3,11 - DIKETO - TRANS-17(20)-PREGNEN-21-OATE, 3-CYCLIC ETHYLENE ACETAL

A solution of 10 g. of methyl 5α,16β-dihydroxy-6β-methyl-3,11 - diketo - trans - 17(20) - pregnen - 21-oate, 3-cyclic ethylene acetal in 125 ml. of cold methylene chloride was treated with 20 ml. of N,N-diethyl-1,2,2-trichlorovinylamine and maintained under a nitrogen atmosphere at 5° C. for 3½ hours. The dark-yellow solution was shaken with 500 ml. of cold saturated sodium bicarbonate solution, then washed with water, dried over anhydrous sodium sulfate, and evaporated to an orange-colored oily residue from which some crystals separated upon standing. The crude material was taken up in methylene chloride and chromatographed over 500 g. of Florisil magnesium silicate. The column was eluted with 2.5 l. of 2.5% acetone in Skellysolve B, 2.5 l. of 5% acetone:95% Skellysolve B hexanes, 2.5 l. of 10% acetone:90% Skellysolve B hexanes, 5 l. of 15% acetone: balance Skellysolve B hexanes, and 3 l. of 25% acetone:75% Skellysolve B hexanes. The eluates were collected in 500 ml. fractions and were evaporated. By thin layer chromatography on silica gel and by infrared data the various fractions were found to possess the following composition.

A. Fractions 1–7: Oils associated with the trichlorovinylamine reagent.
B. Fractions 8–12: 0.719 g. of crude 16-chloro acetal.
C. Fractions 13–15: 0.179 g. of mixed acetal and methyl 3 - keto - 6 - methyl - 16 - chloro - 4,17(20) - pregnadien-21-oate.
D. Fractions 16–20: 1.414 g. of the same 3-keto-6-methyl-16-chloropregnadiene acid ester as C.
E. Fraction 21: 0.445 g. of mixed methyl 17(20)-pregnen-21-oate as in C and of methyl 3,11-diketo-5α-hydroxy 6β-methyl-16α-chloro-17(20)-pregnen-21-oate.
F. Fractions 22–36: 6.829 g. of methyl 3,11-diketo-5α-hydroxy - 6β - methyl - 16α - chloro - 17(20) - pregnen-21-oate.

The combined fractions (F) were treated at reflux for 6 hours with 600 ml. of benzene, 25 ml. of ethylene glycol and 0.51 g. of toluenesulfonic acid. The water formed in the reaction was removed by azeotropic distillation. After washing with sodium bicarbonate solution, then water, and drying with anhydrous sodium sulfate and evaporating, the crude 16α-chloro ketal was combined with the cyclic acetal of fractions (B) and recrystallized from acetone to give 6.64 g. (63.5%) of the desired methyl 16α - chloro - 5α - hydroxy - 6β - methyl - 3,11-diketo-trans-17(20)-pregnen-3-cyclic ethylene acetal of melting point 194–200° C. which upon recrystallization from acetone had a melting point of 203–205° C. and an analysis as follows:

*Analysis.*—Calcd. for $C_{25}H_{35}O_6Cl$: C, 64.29; H, 7.55; Cl, 7.59. Found: C, 64.56; H, 7.57; Cl, 7.63.

Free, unketalized compounds, as in fractions (F), upon purification gave methyl 16α-chloro-5α-hydroxy-6β-methyl-3,11-diketo-trans-17(20)-pregnen-21-oate, melting at 221–223° C. with decomposition and having an analysis as follows:

*Analysis.*—Calcd. for $C_{23}H_{31}O_5Cl$: C, 65.31; H, 7.39; Cl, 8.38. Found: C, 65.32; H, 7.57; Cl, 8.46.

Recrystallizing the product of fractions (D) resulted in methyl 3,11-diketo-6α-methyl-16α-chloro-trans-4,17(20)-pregnadien-21-oate of melting point 178–180° C. and an analysis as follows:

*Analysis.*—Calcd. for $C_{23}H_{29}O_4Cl$: C, 68.22; H, 7.22; Cl, 8.76. Found: C, 68.03; H, 7.41; Cl, 8.82.

EXAMPLE 33.—METHYL 16α - CHLORO - 5α - HYDROXY - 6β - FLUORO - 3,11 - DIKETO - TRANS-17(20) - PREGNEN - 21 - OATE, 3-CYCLIC ETHYLENE ACETAL

In the same manner described in Example 32, 5 g. of methyl 5α - hydroxy - 6β-fluoro-3,11-diketo-16β-hydroxy-trans-17(20)-pregnen-21-oate, 3-cyclic ethylene acetal was treated with N,N-diethyl-1,1,2-trichlorovinylamine to give the corresponding 16α-chloro compound in ketalized and non-ketalized form, which after reketalization of the mixture resulted in 2.68 g. of crude methyl 16α-chloro-5α-hydroxy-6β-fluoro-3,11-diketo-trans-17(20) - pregnen-21-oate, 3-cyclic ethylene acetal, which upon recrystallization began to melt between 140–150° C. and thereupon to resolidify and to melt again between 189–194° C. with decomposition. This methyl 16α-chloro-5α-hydroxy-6β-fluoro-3,11-diketo-trans-17(20)-pregnen-21-oate, 3-cyclic ethylene acetal had an analysis as follows:

*Analysis.*—Calcd. for $C_{24}H_{32}O_6FCl$: C, 61.20; H, 6.85; Cl, 7.53; F, 4.03. Found: C, 61.92; H, 7.38; Cl, 7.50; F, 3.81.

In the same manner as given in Example 32, other 16-hydroxy-17(20)-pregnen-21-oate methyl esters can be converted to 16-chloro-17(20)-pregnen-21-oate alkyl esters by treating the starting material with an N,N-dialkyl-1,2,2-trichlorovinylamine in which the alkyl group is a lower alkyl having from 1–6 carbon atoms. Preferred for this reaction is the N,N-diethyl-1,2,2-trichlorovinylamine. In this manner, from 16α-hydroxypregnene compounds the 16β-chloropregnene compounds are obtained and from 16β-hydroxy-17(20)-pregnene compounds the 16α-chloro-17(20)-pregnene compounds are obtained.

*Conversion of 16-chloro- and 16-fluoro-17(20)-pregnen-21-oate alkyl esters to useful 16-halohydrocortisone-type compounds.*

The conversion of the compounds obtained in the foregoing examples, namely 16-halo-17(20)-pregnen-21-oate alkyl esters, to the corresponding 16-halohydrocortisone-type compounds requires essentially the reduction of the 21-carboxyl group to a —$CH_2OH$ group, simultaneous reduction of 11-keto groups to 11β-hydroxy groups, and establishing the 17-hydroxy-20-keto moiety after acylation of the 21-hydroxy group. Obviously other operations may be necessary, depending on the starting material, such as eliminating cyclic acetal groups or establishing double bonds in the A ring.

It was found that one of the difficulties concerning the reduction step was the fact that the 16-halo groups, particularly 16-chloro groups, were easily reduced so that the carbon atom in the 16-position was only substituted by hydrogen. This particularly occured with ordinary reducing agents, such as the common lithium aluminum hydride. Thus, reduction of methyl 3,11-diketo-16α-chloro-5α-trans-17(20)-pregnen-21-oate, 3-cyclic ethylene acetal was found upon reduction with lithium aluminum hydride in tetrahydrofuran to give as much as 82% of 11β,21-dihydroxy-5α-trans-17(20) - pregnen - 21 - oate, 3-cyclic ethylene acetal, the acetate of which had a melting point of 126–127° C. When the 16-position was occupied by fluorine, lithium aluminum hydride could usually be used for the above-mentioned reduction. When the 16-position was chlorine, however, diisobutyl aluminum hydride had to be used as a reducing agent, as shown in Example 34.

EXAMPLE 34.—5α,11β,21-TRIHYDROXY-6β-METHYL - 16α- CHLORO - 17α,21 - PREGNEN - 3 - ONE, 3-CYCLIC ETHYLENE ACETAL, 21-ACETATE

A mixture of 0.8 ml. of diisobutyl aluminum hydride and 25 ml. of anhydrous ether, in a nitrogen atmosphere, and contained in an ice-bath cooling mixture under stirring, was treated drop-wise during 5 minutes with a solution of 467 mg. of methyl 16α-chloro-5α-hydroxy-6β-methyl-3,11-diketo-trans-17(20)-pregnen-21-oate, 3-cyclic ethylene acetal in 15 ml. of dry benzene. The mixture was thereupon stirred for 1 hour at 0 to 5° C., then treated with a little ethyl acetate and water and the organic phase separated with the aid of additional ethyl acetate. The organic phase was thereupon evaporated to give a dried extract consisting of a colorless gum, which was acetylated for 2½ hours at room temperature in 2.5 ml. of pyridine and 2 ml. of acetic anhydride. The excess reagent was blown off with a stream of nitrogen and the residue chromatographed over 25 g. of Florisil. The product was eluted with 5% acetone:95% Skellysolve B hexanes and evaporated to give 334 mg., 69% of theory, of 16α - chloro - 5α,11β,21 - trihydroxy - 6β-methyl-trans-17(20)-pregnen-3-one, 3-cyclic ethylene acetal, 21-acetate. This material was recrystallized from acetone: Skellysolve B hexanes to give the pure product in blades melting at 148–149° C. and having an analysis as follows:

Analysis.—Calcd. for $C_{26}H_{39}O_6Cl$: C, 64.65; H, 8.14; Cl, 7.34. Found: C, 64.21; H, 8.11; Cl, 7.39.

EXAMPLE 35.—5α,11β,21 - TRIHYDROXY-6β,16α-DIFLUORO-TRANS-17(20) - PREGNEN - 3 - ONE, 3-CYCLIC ETHYLENE ACETAL

To a suspension of 11.6 g. of lithium aluminum hydride in 340 ml. of anhydrous ether at 0 to 5° C. was added dropwise 34.2 g. of methyl 5α-hydroxy-6β,16α-difluoro-3,11-diketo-trans-17(20)-pregnen-21-oate, 3-cyclic ethylene acetal, dissolved in 510 ml. of tetrahydrofuran (purified prior by passing through alumina), and in 1020 ml. of anhydrous ether. The temperature was maintained at 0–5° C. during addition for a period of 2 more hours. The reaction mixture was thereupon decomposed by addition of 500 ml. of ethyl acetate, added dropwise at first, followed by 250 ml. of water. The organic phase was decanted and the aqueous phase was diluted with 1,000 ml. of water and extracted with ethyl acetate. The combined organic phase and extracts was washed with water and dried over anhydrous sodium sulfate and evaporated to dryness. Chromatography of the residue over Florisil anhydrous magnesium silicate gave 23.8 g. of product in the fractions obtained with 20% acetone:80% Skellysolve B. This material was recrystallized from benzene to give pure 5α,11β,21-trihydroxy-6β,16α-difluoro-trans-17(20)-pregnen-3-one, 3-cyclic ethylene acetal of melting point 207° C. with decomposition and an analysis as follows:

Analysis.—Calcd. for $C_{23}H_{34}F_2O_6$: C, 64.46; H, 8.00; F, 8.87. Found: C, 65.04; H, 8.22; F, 8.73.

EXAMPLE 36.—5α,11β,21-TRIHYDROXY - 6β,16α-DIFLUORO-CIS-17(20)-PREGNEN-3-ONE, 3-CYCLIC ETHYLENE ACETAL

Using essentially the same procedure as in Example 35 for the trans compound, 5.54 g. of methyl 5α-hydroxy-6β,16α - difluoro-3,11-diketo-cis-17(20)-pregnen-21-oate, 3-cyclic ethylene acetal was reduced with lithium aluminum hydride to give 4.27 g. of product from the column, which after recrystallization from ethyl acetate was found to be 5α,11β,21 - trihydroxy - 6β,16α-difluoro-cis - 17(20)-pregnen-3-one, 3-cyclic ethylene acetal of melting point 195–196° C. with decomposition, a rotation $[\alpha]_D$ −22° in chloroform and an analysis as follows:

Analysis.—Calcd. for $C_{23}H_{34}F_2O_6$: C, 64.46; H, 8.00; F, 8.87. Found: C, 64.65; H, 8.23; F, 8.34.

EXAMPLE 37.—5α,11β-DIHYDROXY-21-ACETOXY-6β,16α-DIFLUORO - TRANS-17(20) - PREGNEN-3-ONE, 3-CYCLIC ETHYLENE ACETAL

A solution of 23.8 g. of 5α,11β,21-trihydroxy-6β,16α-difluoro-trans-17(20)-pregnen-3-one, 3-cyclic ethylene acetal in 200 ml. of pyridine and 200 ml. of acetic anhydride was allowed to stand at room temperature for 16 hours. It was then slowly added to a stirred mixture of ice water, and the resulting solids (25.6 g.) were isolated. This material was recrystallized from 3A alcohol (ethanol containing 5% methanol) to give 22.3 g. of material melting at 210–212° C. with decomposition. An analytical sample of pure 5α,11β-dihydroxy-21-acetoxy-6β,16α-difluoro-trans-17(20)-pregnen-3-one, 3-cyclic ethylene acetal melted at 207–209° C. with decomposition, had a rotation $[\alpha]_D$ −21° in chloroform and an analysis as follows:

Analysis.—Calcd. for $C_{25}H_{36}F_2O_6$: C, 63.81; H, 7.71; F, 8.08. Found: C, 63.54; H, 8.01; F, 8.25.

EXAMPLE 38.—5α,11β-DIHYDROXY-6β,16α-DIFLUORO-21-ACETOXY-CIS-17(20) - PREGNEN-3-ONE, 3-CYCLIC ETHYLENE ACETAL

In a manner similar to that given in Example 37, 4.2 g. of 5α,11β,21 - trihydroxy - 6β,16α-difluoro-cis - 17(20)-pregnen-3-one, 3-cyclic ethylene acetal was acetylated in pyridine with acetic anhydride to give 4.5 g. of material of melting point 178–185° C. which was recrystallized from ethyl acetate to give pure 5α,11β-dihydroxy-6β,16α-difluoro-21-acetoxy-cis-17(20)-pregnen-3-one, 3-cyclic ethylene acetal of melting point 186–188° C.; rotation $[\alpha]_D$ −18° in chloroform and the following analysis:

Analysis.—Calcd. for $C_{25}H_{36}F_2O_6$: C, 63.81; H, 7.71; F, 8.08. Found: C, 64.32; H, 7.57; F, 8.38.

EXAMPLE 39.—5α,11β,17α - TRIHYDROXY-6β,16α-DIFLUORO-21 - ACETOXYPREGNANE - 3,20 - DIONE, 3-CYCLIC ETHYLENE ACETAL

A solution of 24.5 g. of 5α,11β-dihydroxy-6β,16α-difluoro-21-acetoxy-trans-17(20)-pregnen - 3 - one, 3-cyclic ethylene acetal in 3 liters of t-butyl alcohol and 50 ml. of pyridine was prepared by heating on the steam bath. After cooling to about 30° C., nitrogen was bubbled through the solution and 62.5 ml. of 2 N N-methylmorpholine oxide-hydrogen peroxide complex in t-butyl alcohol was added, followed by 1.65 g. of osmium tetroxide. The mixture was allowed to stand at room temperature for a period of 90 hours. Thereafter, 750 ml. of aqueous 0.5% solution of sodium hydrosulfite was added and the reaction mixture stirred for 15 minutes. Thereafter 25 g. of magnesium silicate (Magnesol) was added and stirring continued for another 15 minutes. The mixture was thereupon filtered through diatomaceous earth (Celite) and the filtrate was concentrated to a volume of 300–400 ml. under reduced pressure at 60° C. water bath temperature. This quantity was extracted with 1500 ml. of methylene chloride in three portions, the methylene chloride solution was washed with water, dried over anhydrous sodium sulfate, and evaporated to dryness. The residue was then chromatographed over Florisil magnesium silicate. The first fraction from the column, eluted with 7.5% acetone:92.5% Skellysolve B hexanes, was 8.7 g. of starting material. The product fraction appeared in 10% acetone:90% Skellysolve B solution and amounted to 9.2 g. The 9.2 g. of material was recrystallized from 3A alcohol to give 5.7 g. of material melting at 242–244° C. A second recrystallization gave pure 5α,11β,17α-trihydroxy-6β,16α - difluoro-21-acetoxypregnane-3,20-dione, 3-cyclic ethylene acetal of melting point 245–247° C. with decomposition; rotation $[\alpha]_D$ +9° in chloroform and an analysis as follows:

Analysis.—Calcd. for $C_{25}H_{36}F_2O_8$: C, 59.75; H, 7.22; F, 7.56. Found: C, 59.82; H, 7.40; F, 7.55.

In the same manner given in Example 39, 1 g. of 5α,11β,17α - trihydroxy - 6β,16α - difluoro - 21 - acetoxy - cis-17(20)-pregnen-3-one, 3-cyclic ethylene acetal was treated with N-methylmorpholine oxide-hydrogen peroxide complex and osmium tetroxide in the presence of pyridine and t-butyl alcohol to give, after recrystallization from acetone:Skellysolve B hexanes, a total of 165 mg. of 5α,11β,17α - trihydroxy - 6β,16α - difluoro - 21 - acetoxypregnane-3,20-dione, 3-cyclic ethylene acetal, identical to the compound obtained from the trans isomer.

EXAMPLE 40.—6α,16α-DIFLUOROHYDROCORTISONE, 21-ACETATE

A solution of 5 g. of 5α,11β,17α-trihydroxy-6β,16α-difluoro-21-acetoxypregnane-3,20-dione, 3-cyclic ethylene acetal in 600 ml. of chloroform and 4 ml. of absolute ethyl alcohol was cooled to −10 to −5° C. Hydrogen chloride was bubbled through the solution for 2 hours while the temperature was maintained at −10 to −5° C. The reaction solution was then washed with aqueous dilute sodium bicarbonate, thereafter with water, and then dried over anhydrous sodium sulfate and evaporated to dryness. The thus-obtained residue was crystallized from 3A alcohol to give 3.62 g. of material melting at 224–227° C., which upon recrystallization from ethyl alcohol gave pure 6α,16α-difluorohydrocortisone, 21-acetate of melting point 228–230° C.; rotation $[\alpha]_D$ +100° in acetone and having an analysis as follows:

Analysis.—Calcd. for $C_{23}H_{30}F_2O_6$: C, 62.71; H, 6.87; F, 8.63. Found: C, 62.58; H, 7.08; F, 8.72.

EXAMPLE 41.—6α,16α-DIFLUOROPREDNISOLONE ACETATE

A mixture of 5 g. of 6α,16α-difluorohydrocortisone acetate, 3.25 g. of selenium dioxide, 15 ml. of acetic acid and 350 ml. of t-butyl alcohol was stirred and refluxed for 23 hours. The heat was turned off and 10 g. of Magnesol (magnesium silicate) was added and the mixture stirred for 30 minutes. The mixture was then filtered through diatomaceous earth (Celite) and the filtrate was concentrated to dryness under reduced pressure at a water bath temperature of 60° C. The residue was redissolved in 250 ml. of ethyl acetate and the solution was washed with dilute sodium bicarbonate solution and water. It was thereupon dried over anhydrous sodium sulfate and treated with 10 g. of activated charcoal (Darco G-60). This solution was then filtrated to remove the charcoal and concentrated to about 50 ml. The 50 ml. of solution was then diluted with Skellysolve B hexanes and further concentrated to near cloudiness. Upon cooling resulted 2.31 g. of a crystalline product melting between 230 and 240° C. This product was recrystallized from acetone to give pure 6α,16α-difluoroprednisolone acetate melting at 243–245° C. and having a rotation $[\alpha]_D$ +70° in acetone and an analysis as follows:

Analysis.—Calcd. for $C_{23}H_{28}F_2O_6$: C, 63.00; H, 6.44; F, 8.67. Found: C, 62.88; H, 6.61; F, 8.68.

EXAMPLE 42.—METHYL 16α - CHLORO - 5α - HYDROXY - 6β - METHYL - 3,11 - DIKETO - CIS-17(20)-PREGNEN-21-OATE, 3-CYCLIC ETHYLENE ACETAL

In the same manner as described in Example 30, methyl 5α,16β - dihydroxy-6β-methyl-3,11-diketo-cis-17(20)-pregnen-21-oate, 3-cyclic ethylene acetal was reacted with N,N-diethyl-1,2,2-trichlorovinylamine to give methyl 16α-chloro - 6β - methyl - 5α - hydroxy - 3,11 - diketo - cis-17(20)-pregnen-21-oate, both in ketalized and unketalized form Reketalization of the mixture gave methyl 16α-chloro - 5α - hydroxy - 6β - methyl - 3,11-diketo - cis-17(20)-pregnen-21-oate, 3-cyclic ethylene acetal having a melting point of 217–219° C. with decomposition and an analysis as follows:

Analysis.—Calcd. for $C_{25}H_{35}O_6Cl$: C, 64.29; H, 7.55; Cl, 7.59. Found: C, 64.14; H, 7.37; Cl, 7.68.

The unketalized product methyl 16α-chloro-5α-hydroxy-6β - methyl - 3,11 - diketo - cis - 17(20) - pregnen - 21-oate had a melting point of 231–232° C. and an analysis as follows:

Analysis.—Calcd. for $C_{23}H_{31}O_5Cl$: C, 65.31; H, 7.39; Cl, 8.38. Found: C, 65.22; H, 7.19; Cl, 8.46.

EXAMPLE 43.—16α - CHLORO-5α,11β,17α,21-TETRAHYDROXY - 6β - METHYLPREGNANE - 3,20 - DIONE, 21-ACETATE, 3-CYCLIC ETHYLENE ACETAL

A solution of 6.37 g. of 16α-chloro-5α,11β,21-trihydroxy-6β-methyl-trans-17(20)-pregnen-3-one, 21-acetate, 3-cyclic ethylene acetal in 760 ml. of t-butyl alcohol and 12.8 ml. of pyridine was prepared by warming. The thus-obtained solution was then cooled to room temperature and thereupon 14.1 ml. of N-morpholine oxide-hydrogen peroxide solution and 410 mg. of osmium tetroxide were added. The mixture was stirred until a solution was obtained and this solution was allowed to stand at room temperature for 92 hours. During this time, clear colorless crystals slowly formed on the sides of the flask. The reaction mixture was then decanted from the crystals and the crystals recrystallized from acetone to yield 0.80 g. of 16α-chloro-5α,11β,17α,21-tetrahydroxy-6β-methylpregnane-3,20-dione, 21-acetate, 3-cyclic ethylene acetal. A second crop of 0.20 g. of the same material, melting point 230–239° C. with decomposition, was obtained. The decanted portion of the reaction mixture was treated with 2.5 g. of sodium hydrosulfite in 100 ml. of water and concentrated at reduced pressure to about 250 ml. volume. After saturating with sodium chloride, the mixture was extracted thoroughly with ethyl acetate, which was then dried and evaporated to a brown, partially crystalline residue. Upon slurrying with methylene chloride, additional crystalline product was obtained amounting to 0.70 g. of melting point 255–257° C. with decomposition. The methylene chloride filtrate was chromatographed on 250 g. of Florisil. Elution with 5% acetone in 95% Skellysolve B hexanes gave as first product 2.986 g. (47%) of recovered starting material followed by 750 mg. of product-containing fractions. The latter fractions were combined and recrystallized from acetone to give 0.56 g. of material of melting point 257–259° C. with decomposition. Therefore, the total yield of crystalline product was 2.34 g. (34.7% of theory) of 16α-chloro-5α,11β,17α,21-tetrahydroxy-6β - methylpregnane-3,20-dione, 21 - acetate, 3-cyclic ethylene acetal.

On recrystallization an analytical sample was obtained from acetone melting at 257–259° C. with decomposition. Analysis was as follows:

Analysis.—Calcd. for $C_{26}H_{39}O_8Cl$: C, 60.63; H, 7.63; Cl, 6.89. Found: C, 60.70; H, 7.65; Cl, 6.89.

EXAMPLE 44.—16α-CHLORO-6α-METHYLHYDROCORTISONE ACETATE

A suspension of 2.18 g. of 16α-chloro-5α,11β,17α,21-tetrahydroxy-6β-methylpregnane-3,20-dione, 21-acetate, 3-cyclic ethylene acetal in 250 ml. of chloroform and 0.75 ml. of absolute ethanol was cooled to 0° C. in a salt-ice bath and maintained at this temperature for 1.5 hours while a stream of gaseous hydrogen chloride was bubbled into the mixture. The steroid dissolved and the solution became blue-green colored. The solution was washed with sodium bicarbonate solution, dried over anhydrous sodium sulfate and evaporated to a yellow gum which crystallized from acetone-Skellysolve B hexanes giving 1.22 g. of needles melting at 202–206° C. The mother liquor residues were chromatographed over 50 g. of Florisil magnesium silicate and additional products eluted with 15% acetone-Skellysolve B hexanes. After recrystallization 0.42 g. of material of melting point 200–205° C. was obtained. The total yield therefore was 1.63 g. (85%). A sample, recrystallized for analysis from ethyl acetate-Skellysolve B, gave needles of 16α-chloro-6α-methylhydrocortisone acetate of melting point 205–207° C. IR data showed that this sample contained some solvated material.

EXAMPLE 45.—16α-CHLORO-6α-METHYLPREDNISOLONE ACETATE

A mixture of 1.78 g. of 16α-chloro-6α-methylhydrocortisone, 1.2 g. of selenium dioxide, 120 ml. of t-butyl alcohol and 2.7 ml. of acetic acid was heated under reflux with stirring for 21 hours. After the heat source was removed, 1 g. of activated charcoal was added and stirring continued for 15 minutes. The mixture was then filtered, the filtrate evaporated to give a yellow gum-like material which was taken up in methylene chloride. The methylene chloride solution was washed with aqueous sodium bicarbonate solution, dried over anhydrous sodium sulfate, and chromatographed on 100 g. of Florisil. The column was eluted with 10% and 15% acetone in Skellysolve B hexanes. This, however, gave only a long series of amorphous residues with no real fractionation apparent. The amorphous residue totaling 1.8 g. was therefore recombined and chromatographed over silica gel using ethyl acetate as eluent. The early fractions contained by-products and were therefore discarded. The later fractions were combined and crystallized by means of trituration with anhydrous ether to yield 0.94 g. (53%) yield of 16α-chloro-6α-methylprednisolone having a melting point of 244–247° C. and an analysis as follows:

*Analysis.*—Calcd. for $C_{24}H_{31}O_6Cl$: C, 63.92; H, 6.93; Cl, 7.86. Found: C, 63.88; H, 7.04; Cl, 7.84.

In the same manner as shown in the preceding examples, other alkyl 3-keto-5α-hydroxy-17(20)-pregnen-21-oate, 3-cyclic alkylene acetals, in either cis or trans form, can be converted with selenium dioxide to alkyl 3-keto-5α, 16-dihydroxy-17(20)-pregnen-21-oate, 3-cyclic alkylene acetals. The stereospecific position of the 16-hydroxy group as obtained as a result of the reaction with selenium dioxide can be changed by oxidation to 16-keto steroids and subsequent reduction to 16β-hydroxy steroids with different reducing agents or by conversion of the 16-hydroxy steroid to first a 16-organic sulfonate ester and thereupon to a hydrocarbon carboxylic acid ester of the opposite 16-stereospecific configuration followed by saponification. These 16-hydroxy-17(20)-pregnen-21-oate alkyl esters can be converted with fluorinating agents, such as N-(2-chloro-1,1,2-trifluoroethyl)-dialkylamine to alkyl 3-keto-16-fluoro-17(20)-pregnen-21-oate, 3-cyclic alkylene acetals, or with a chlorinating agent, such as N,N-dialkyl-1,2,2-trichlorovinylamine to alkyl 3-keto-5α-hydroxy-16-fluoro-17(20)-pregnen-21-oate, 3-cyclic alkylene acetals, in which the halogen atom occupies the 16α-position when the 16-hydroxy group of the steroid was 16β, and the 16β-position if the 16-hydroxy group of the steroid was 16α.

The 16-halo steroids can then be reduced with lithium aluminum hydride (if the halogen in the 16-position is fluorine) or with a mild reducing agent, e.g., di-isobutylaluminum hydride or other dialkyl aluminum hydride, when a 16-chloro steroid is reduced, to give the corresponding 16-halo-5α,21-dihydroxy-17(20)-pregnen-3-one, 3-cyclic alkylene acetal. If an 11-keto group is present, an 11β-hydroxy group will be simultaneously formed. Reacting these 17(20)-pregnen-21-acylates formed after acylation of the 21-hydroxyl with morpholine N-oxideperoxide gives the corresponding 16-halo-5α,17α,21-trihydroxypregnane-3,20-dione, 21-acylate, 3-cyclic alkylene acetal, which by treatment with hydrogen chloride gives the corresponding 16-halo-17α,21-dihydroxy-4-pregnene-3,20-dione, 21-acylate, thus:

A. Methyl 3,11 - diketo-5α-hydroxy - cis(or trans) - 17 (20)-pregnen-21-oate, 3-cyclic ethylene acetal can be converted to 16α-chloro- or fluorohydrocortisone.

B. Methyl 6β - methyl-5α-hydroxy-3,11-diketo-17(20)-pregnen-21-oate, 3-cyclic ethylene acetal can be converted to 6α-methyl-16α-chloro- or 16α-fluorohydrocortisone acetate, which can be further converted to the corresponding prednisolone acetates (cf. Example 39).

C. Methyl 6β-fluoro-5α-hydroxy-3,11-diketo-17(20)-cis (or trans)-pregnen-21-oate, 3-cyclic ethylene acetal can be converted to 6α,16α-difluoroprednisolone acetate.

These compounds, if desired, can be easily converted to 9α-fluoro or 9α-chloro derivatives by well known steps in the art: dehydration of the 9,11-position and addition of a hypohalous acid on the 9(11)-double bond to obtain the halohydrin; treating the halohydrin with a base to obtain the corresponding 9β,11β-oxido steroid and treating the oxido steroid with hydrogen fluoride or hydrogen chloride.

In this manner, e.g., 16α-chloro-6α-methylprednisolone is converted to 6α-methyl-9α-fluoro-16α-chloroprednisolone acetate having a melting point of 272–274° C. and an analysis as follows:

*Analysis.*—Calcd. for $C_{24}H_{30}O_6ClF$: C, 61.47; H, 6.45; Cl, 7.56; F, 4.05. Found: C, 61.71; H, 6.62; Cl, 7.71; F, 4.01.

EXAMPLE 46.—16β-FLUORO-3β,11β,21-TRIHYDROXY-5α-CIS-17(20)-PREGNENE

Likewise as in Example 35, methyl 16β-fluoro-3β-hydroxy-11-keto-5α-cis-17(20)-pregnen-21-oate, 3 - acetate was reduced with lithium aluminum hydride to give 16β-fluoro-3β,11β,21-trihydroxy-5α-cis-17(20)-pregnene.

In the same manner as in Example 35, but reducing methyl 16α - fluoro-3β-hydroxy-11-keto-5α-trans-17(20)-pregnen-21-oate, 3-acetate with lithium aluminum hydride yields the corresponding 16α-fluoro-3β,11β,21-trihydroxy-5α-trans-17(20)-pregnene.

In the same manner given in Example 34, 16α-chloro-3β,11β,21 - trihydroxy - 5α - trans - 17(20) - pregnene and 16β-chloro-3β,11β,21-trihydroxy-5α-cis-17(20)-pregnene can be prepared from methyl 16α-chloro-3β-hydroxy-11-keto-5α-trans-17(20)-pregnen-21-oate, 3-acetate, or respectively from methyl 16β-chloro-3β-hydroxy-11-keto-5α-cis-17(20)-pregnen-21-oate, 3-acetate by reduction with di-isobutylaluminum hydride.

EXAMPLE 47. — 16α - FLUORO - 3β,11β,21 - TRIHYDROXY-5α-TRANS-17(20)-PREGNENE, 21 - ACETATE

A solution was prepared containing 0.01 mole of 16α-fluoro - 3β,11β,21 - trihydroxy - 5α - trans - 17(20) - pregnene in 20 ml. of pyridine containing 0.011 mole of acetic anhydride. The mixture was allowed to stand for two hours and was thereupon poured into ice water and extracted with 3 portions of 20 ml. each of methylene dichloride. The methylene dichloride extracts were combined, washed with water and dried over anhydrous sodium sulfate. Evaporation of the solvent gave the crude 21-acetate which was recrystallized repeatedly from acetone to give pure 16α-fluoro-3β,11β,21-trihydroxy-5α-trans-17(20)-pregnene, 21-acetate.

In the same manner given in Example 47, the 21-acetate of 16α-chloro-3β,11β-21-trihydroxy-5α-trans-17(20)-pregnene was prepared by reacting 16α-chloro-3β,11β,21-trihydroxy-5α-trans-17(20)-pregnene with 1 to 1.1 molar equivalent acetic anhydride per mole of steroid in pyridine solution.

Oppenauer oxidation of 16α-fluoro-3β,11β,21-trihydroxy-5α-trans-17(20)-pregnene, 21-acetate or of 16α-chloro-3β,11β,21-trihydroxy-5α-trans-17(20)-pregnene, 21-acetate with aluminum isopropoxide in cyclohexanone gave the corresponding 3-keto derivatives of 16α-fluoro-11β,21-dihydroxy-5α-trans-17(20)-pregnen-3-one, 21-acetate, or respectively 16α-chloro-11β,21-dihydroxy-5α-trans-17(20)-pregnen-3-one, 21-acetate.

In the same manner shown in Examples 46 and 47, methyl 16β-fluoro-3β-hydroxy-5α-cis-17(20)-pregnen-21-oate, 3-acetate can be converted to 16β-fluoro-11β,21-dihydroxy-5α-cis-17(20)-pregnen-3-one, 21-acetate.

The 21-acylates of steroids in this invention can all be converted to 21-hydroxy compounds by mild hydrolysis using sodium bicarbonate or potassium bicarbonate in aqueous methanol solution in a nitrogen atmosphere. Representative 21-hydroxy steroids produced by such hydrolysis include: 16α-chloro-5α,11β,21-trihydroxy-6β-methyl-trans-17(20)-pregnen-3-one, 3-cyclic ethylene acetal; 5α,11β,21-trihydroxy-6β,16α-difluoro-trans-17(20)-pregnen-3-one, 3-cyclic ethylene acetal; 5α,11β,21-trihydroxy-6β,16α-difluoro-cis-17(20)-pregnen-3-one, 3-cyclic ethylene acetal; 5α,11β,17α,21-tetrahydroxy-6β,16α-difluoropregnene-3,20-dione, 3-cyclic ethylene acetal; 6α,16α-difluorohydrocortisone; 6α,16α-difluoroprednisolone; the corresponding 16α- and 16β-chloro analogues of these compounds; 6α-methyl-16α-chlorohydrocortisone and 6α-methyl-16α-chloroprednisolone, and the like.

EXAMPLE 48.—HYDROXYLATION OF METHYL 3,11-DIKETO-CIS-5,17(20)-PREGNADIEN-21-OATE, 3-CYCLIC ETHYLENE ACETAL

A mixture of 2.0 g. of methyl 3,11-diketo-cis-5,17(20)-pregnadien-21-oate, 3-cyclic ethylene acetal, 2.0 g. of selenium dioxide and 80 ml. of tetrahydrofuran was refluxed with stirring for 3½ hours. Thereafter, the reaction mixture was allowed to cool to room temperature and was then filtered through Celite diatomaceous earth. The filtrate was diluted with 400 ml. of water and extracted with 600 ml. of ethyl acetate in 200 ml. portions. The extract was washed with water, dried, and boiled with about 3 g. of activated charcoal (Darco G-60) for 30 minutes. The activated charcoal was removed by filtration and the filtrate was concentrated to dryness. The residue (1.7 g.) was chromatographed over 100 g. of Florisil anhydrous magnesium silicate using mixture of acetone and Skellysolve B hexanes for elution. Three portions came off the column: (A) 549 mg. with acetone-Skellysolve B hexanes (7.5:92.5 and 10:90); (B) 587 mg. with acetone-Skellysolve B hexanes (15:85); (C) 296 mg. with acetone-Skellysolve B hexanes (15:85 and 20:80). Crystallization of the three fractions from acetone-Skellysolve B hexanes gave three products: (A) 383 mg., melting point 253–258° C.; (B) 485 mg., melting point 218–223° C.; (C) 119 mg., melting point 256–262° C. Analytical samples were prepared and gave the following results:

A. Methyl 3,11-diketo-16β-hydroxy-trans-5,17(20)-pregnadien-21-oate, 3-cyclic ethylene acetal, melting point 263–265° C., rotation $[\alpha]_D$ +26° (dioxane), and analysis as follows:

Analysis.—Calcd. for $C_{24}H_{32}O_6$: C, 69.21; H, 7.75. Found: C, 68.87; H, 8.00.

B. Methyl 3,11-diketo-16α-hydroxy-cis-5,17(20)-pregnadien-21-oate, 3-cyclic ethylene acetal; melting point 238–243° C.; rotation $[\alpha]_D$ −10° in dimethylformamide. Analysis was as follows:

Analysis.—Calcd. for $C_{24}H_{32}O_6$: C, 69.21; H, 7.75. Found: C, 68.69; H, 7.48.

C. Methyl 3,11-diketo-7,16-dihydroxy-5,17(20)-pregnadien-21-oate, 3-cyclic ethylene acetal; melting point 268–270° C. Analysis was as follows:

Analysis.—Calcd. for $C_{24}H_{32}O_7$: C, 66.65; H, 7.46. Found: C, 67.17; H, 7.78.

EXAMPLE 49.—CHLORINATION OF METHYL 3,11-DIKETO-16β-HYDROXY-TRANS-5,17(20)-PREGNADIEN-21-OATE, 3-CYCLIC ETHYLENE ACETAL

To a solution of 3.0 g. of methyl 3,11-diketo-16β-hydroxy-trans-5,17(20)-pregnadien-21-oate, 3-cyclic ethylene acetal in 120 ml. of methylene chloride was added 6 ml. of N,N-diethyl-1,2,2-trichlorovinylamine. The mixture was allowed to stand at room temperature for 16 hours. The dark-reddish reaction mixture was thereupon washed with aqueous saturated sodium bicarbonate solution, then with water, dried over anhydrous sodium sulfate, and chromatographed over 200 g. of Florisil anhydrous magnesium silicate. The fractions, eluted with 7.5 and 10% acetone:92.5 and 90% Skellysolve B hexanes, gave:

(1) 851 mg. of methyl 3,11-diketo-16α-chloro-trans-4,17(20)-pregnadien-21-oate. An analytical sample, recrystallized from ethyl acetate, melted at 196–198° C.; rotation $[\alpha]_D$ −31° in chloroform. Analysis was as follows:

Analysis.—Calcd. for $C_{22}H_{27}O_4Cl$: C, 67.59; H, 6.96; Cl, 9.07. Found: C, 67.38; H, 6.87; Cl, 9.05.

(2) Eluted with 15% acetone:85% Skellysolve B hexanes a second fraction of 1.58 g. methyl 3,11-diketo-16β-hydroxy-trans-4,17(20)-pregnadien-21-oate. An analytical sample, recrystallized from ethyl acetate, melted at 224–226° C.; rotation $[\alpha]_D$ +214° in chloroform. Analysis was as follows:

Analysis.—Calcd. for $C_{22}H_{28}O_5$: C, 70.94; H, 7.58. Found: C, 71.20; H, 7.87.

Treatment of this second fraction with trichlorovinylamine reagent gave the 16-chlorinated compound, same as the first column fractions above, in good yield.

EXAMPLE 50.—METHYL 3,11-DIKETO-16α-CHLORO-TRANS-5,17(20)-PREGNADIEN-20-OATE, 3-CYCLIC ETHYLENE ACETAL

A solution of 0.4 g. of methyl 3,11-diketo-16α-chloro-trans-4,17(20)-pregnadien-21-oate, 4 ml. of ethylene glycol, 20 mg. p-toluenesulfonic acid monohydrate, and 40 ml. of benzene was stirred and refluxed for 3½ hours. The water formed in the reaction was removed by azeotropic distillation through a water trap. After cooling, washing with water, and drying with anhydrous sodium sulfate, the solvent was removed and the residue was crystallized from acetone-Skellysolve B hexanes to give 340 mg. of methyl 3,11-diketo-16α-chloro-trans-5,17(20)-pregnadien-21-oate, 3-cyclic ethylene acetal of melting point 165–167° C. An analytical sample melted at 167–169° C. and had a rotation $[\alpha]_D$ −166° in chloroform. Analysis was as follows:

Analysis.—Calcd. for $C_{24}H_{31}ClO_5$: C, 66.27; H, 7.18; Cl, 8.15. Found: C, 66.13; H, 7.09; Cl, 8.38.

EXAMPLE 51.—EPOXIDATION OF METHYL 3,11-DIKETO-16α-CHLORO-TRANS-5,17(20)-PREGNADIEN-21-OATE, 3-CYCLIC ETHYLENE ACETAL

A suspension of 0.3 g. of sodium acetate in 3 ml. of 40% peracetic acid was cooled below 0° C. To this suspension was added a pre-cooled solution of 1.38 g. of methyl 3,11-diketo-16α-chloro-trans-5,17(20)-pregnadien-21-oate, 3-cyclic ethylene acetal in 28 ml. of chloroform. The mixture was stirred at −10 to 0° C. for 3 hours. It was then washed with saturated sodium bicarbonate solution, then with water, and was dried over anhydrous sodium sulfate. This chloroform solution was diluted with an equal volume of methylene chloride and chromatographed over 100 g. of Florisil anhydrous magnesium silicate. Two fractions were recovered from the column:

A. 0.74 g., was eluted with 5 and 7.5% acetone:95 and 92.5% Skellysolve B hexanes.

B. 0.64 g., was eluted with 10 and 15% acetone:90 and 85% Skellysolve B hexanes.

Both fractions were crystallized from acetone:Skellysolve B hexanes to give:

A. 620 mg., melting point 153–170° C., of the β-oxide isomer.

B. 494 mg., melting point 195–198° C., of methyl 3,11-diketo-5α,6α-oxido - 16α - chloro-trans-17(20)-pregnen-21-oate, 3-cyclic ethylene acetal.

EXAMPLE 52.—REDUCTION AND ACETYLATION OF METHYL 3,11 - DIKETO - 5α,6α - OXIDO - 16α-CHLORO-17(20)-PREGNEN-21-OATE, 3-CYCLIC ETHYLENE ACETAL

To a solution of 0.75 ml. of di-isobutylaluminum hydride in 15 ml. of anhydrous ether, in an atmosphere of nitrogen, and at 0 to 5° C. was added a solution of 451 mg. of methyl 3,11-diketo-5α,6α-oxido-16α-chloro-trans-17(20)-pregnen-21-oate, 3-cyclic ethylene acetal in 15 ml. of benzene. The mixture was thereupon stirred for 1.5 hours at 0 to 5° C., then 2 ml. of ethyl acetate was added followed by 15 ml. of water. The organic phase was separated with the aid of additional ether and water and was washed with water, dried with anhydrous sodium sulfate and concentrated to dryness under reduced pressure.

The resulting solid residue, consisting of the 21-hydroxy compound, was dissolved in 2 ml. of pyridine and 2 ml. of acetic anhydride and was allowed to stand at room temperature for 4 hours. This reaction mixture was then poured into ice and water and the resulting solid was isolated by filtration and chromatographed over 50 g. of Florisil. Two fractions were eluted from the column. One (101 mg.) with 7.5% acetone:92.5% Skellysolve B hexanes and the second (132 mg.) with 10 and 15% acetone:90 and 85% Skellysolve B hexanes. Both fractions were crystallized from acetone:Skellysolve B and from acetone. The first fraction gave 45 mg., melting point 198–203° C. with decomposition, of 5α,11β,21-trihydroxy-16α-chloro-21-acetoxy-trans - 17(20)-pregnen-3-one, 21-acetate, 3-cyclic ethylene acetal.

The second fraction gave 41 mg., melting point 186–192° C. with decomposition, of 5α,6α-oxido-11β,21-dihydroxy-16α-chloro-trans-17(20)-pregnen-3-one, 21-acetate, 3-cyclic ethylene acetal.

EXAMPLE 53.—5α,6α-OXIDO - 11β,17α,21 - TRIHYDROXY - 16α - CHLORO-PREGNANE-3,20-DIONE, 21-ACETATE, 3-CYCLIC ETHYLENE ACETAL

A solution of 215 mg. of 5α,6α-oxido-11β,21-dihydroxy-16α-chloro-trans-17(20)-pregnen-3-one, 21-acetate, 3-cyclic ethylene acetal in 30 ml. of t-butyl alcohol and 1 ml. of pyridine was prepared by heating on the steam bath. After cooling to about 30° C. nitrogen was bubbled through the solution and 0.7 ml. of 2 N N-morpholineoxide-hydrogen peroxide complex in t-butyl alcohol was added followed by 20 mg. of osmium tetroxide. The mixture was allowed to stand at room temperature for a period of 90 hours. Thereafter 7.5 ml. of aqueous 0.5 N solution of sodium hydrosulfite was added and the reaction mixture stirred for 15 minutes. Thereafter 250 mg. of magnesium silicate (Magnesol) was added and stirring continued for another 15 minutes. The mixture was thereupon filtered through diatomaceous earth (Celite) and the filtrate was concentrated to a volume of 3 to 4 ml. under reduced pressure at 60° C. water bath temperature. This quantity was extracted with three 15-ml. portions of methylene chloride. The methylene chloride extracts were combined, washed with water, dried over anhydrous sodium sulfate, and evaporated to dryness. The residue was then chromatographed over Florisil magnesium silicate. The first fraction from the column was starting material (elution with 7.5% acetone:92.5% Skellysolve B hexanes). The fractions obtained with 10 to 12.5% acetone, balance Skellysolve B hexanes contained the desired product. These fractions were recrystallized several times from aqueous methanol to give pure 5α,6α-oxido - 11β,17α,21-trihydroxy-16α-chloropregnane-3,20-dione 21-acetate, 3-cyclic ethylene acetal.

EXAMPLE 54.—5α,11β,17α,21-TETRAHYDROXY-6β-FLUORO - 16α-CHLOROPREGNANE-3,20-DIONE, 21-ACETATE, 3-CYCLIC ETHYLENE ACETAL

To a solution of 0.2 g. of 5α,6α-oxido-11β,17α,21-trihydroxy-16α-chloropregnane-3,20-dione, 21-acetate, 3-cyclic ethylene acetal in 3 ml. of methylene chloride was added 1 ml. of 48% hydrofluoric acid. The heterogenous mixture was stirred for 2 hours, made slightly basic with excess of 5% aqueous sodium bicarbonate solution and extracted with three 5-ml. portions of methylene chloride. The methylene chloride extracts were combined, washed with water, dried over anhydrous sodium sulfate, and evaporated to dryness, giving material which was three times recrystallized from aqueous methanol to give pure 5α,11β,17α,21-tetrahydroxy - 6β - fluoro-16α-chloropregnane-3,20-dione, 21-acetate, 3-cyclic ethylene acetal.

EXAMPLE 55.—6α - FLUORO - 11β,17α,21 - TRIHYDROXY-16α-CHLORO-4-PREGNENE-3,20 - DIONE, 21-ACETATE

A solution of 200 mg. of 5α,11β,17α,21-tetrahydroxy-6β-fluoro-16α-chloropregnane-3,20-dione, 21-acetate, 3-cyclic ethylene acetal in 30 ml. of chloroform and one-half milliliter of absolute ethyl alcohol was cooled to −10° C. Into this solution hydrogen chloride gas was bubbled for 2 hours while the temperature was maintained between −10 and −5° C. The reaction mixture was then washed three times with dilute 10% sodium bicarbonate solution, three times with water, and then dried over anhydrous sodium sulfate and evaporated to dryness. A residue was thus obtained which was recrystallized from aqueous ethanol four times to give pure 6α-fluoro-11β,17α,21-trihydroxy-16α-chloro-4-pregnene-3,20-dione, 21-acetate.

EXAMPLE 56.—6α - FLUORO - 11β,17α,21 - TRIHYDROXY - 16α - CHLORO - 1,4 - PREGNADIENE-3,20-DIONE, 21-ACETATE

In the manner shown in Example 41, 1 g. of 6α-fluoro-16α - chloro - 11β,17α,21 - trihydroxy - 4 - pregnene-3,20-dione, 21-acetate was reacted with 0.7 g. of selenium dioxide in t-butyl alcohol and acetic acid to give 6α - fluoro - 11β,17α,21 - trihydroxy - 16α - chloro - 1,4-pregnadiene-3,20-dione, 21-acetate.

6α - fluoro - 16α - chloro - 11β,17α,21 - trihydroxy-1,4-pregnadiene-3,20-dione, 21-acetate can be converted to its 9-fluoro analog by submitting it to the following four process steps: (1) dehydrogenation, for example with N-bromoacetamide in pyridine solution followed by treatment with sulfur dioxide; (2) treating the thus-obtained 6α - fluoro - 16α - chloro - 17α,21 - dihydroxy-1,4,9(11)-pregnatriene-3,20-dione 21-acetate with N- bromoacetamide and perchloric acid in t-butyl alcohol to obtain 6α - fluoro - 9α - bromo - 11β,17α,21 - trihydroxy-16α - chloro - 1,4 - pregnadiene - 3,20 - dione, 21-acetate; (3) treating the thus-obtained 9α-bromo compound with a base such as potassium acetate to obtain 6α-fluoro-9β,11β - oxido - 16α - chloro - 17α,21 - dihydroxy - 1,4-pregnadiene-3,20-dione, 21-acetate; and (4) treating this oxido compound with hydrogen fluoride in tetrahydrofuran and methylene chloride to obtain the desired 6α,9α - difluoro - 16α - chloro - 11β,17α,21 - trihydroxy- 1,4-pregnadiene-3,20-dione 21-acetate having an anti-inflammatory activity of about 1100 times that of hydrocortisone.

I claim:
1. 16 - substituted - 17(20) - pregnen - 21 - oic acids and esters of the formula:

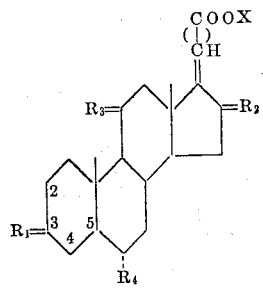

wherein $R_1$ is selected from the group consisting of keto oxygen,

and

in which Ac is an acyl radical of a hydrocarbon carboxylic acid containing from 1 to 12 carbon atoms, inclusive; wherein $R_2$ is selected from the group consisting of =O;

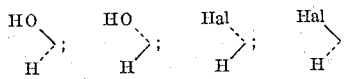

wherein Hal signifies a halogen selected from the group consisting of chlorine and fluorine; wherein $R_3$ is selected from the group consisting of

and =O; wherein $R_4$ is selected from the group consisting of hydrogen, fluorine, and methyl; wherein the linkages of carbon atoms 1,2 and 4,5 are selected from the group consisting of single and double bonds when $R_1$ is keto oxygen, and wherein X is selected from the group consisting of hydrogen and lower alkyl.

2. Methyl 3,11,16 - triketo - trans - 1,4,17(20) - pregnatrien-21-oate.
3. Methyl 16α - chloro - 3,11 - diketo - cis - 1,4,17-(20)-pregnatrien-21-oate.
4. 16-substituted - 17(20) - pregnen - 21 - oic, 3-cyclic ethylene acetals of the formula:

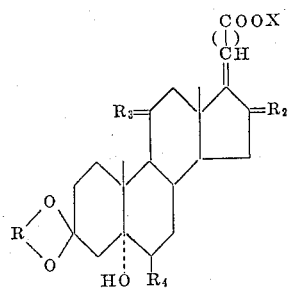

wherein R is an alkylene radical containing up to 8 carbon atoms inclusive and the attaching oxygen to carbon bonds are separated by a chain of at least 2 and not more than 3 carbon atoms; wherein $R_2$ is selected from the group consisting of =O;

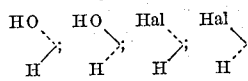

wherein Hal is a halogen selected from the group consisting of chlorine and fluorine; wherein $R_3$ is selected from the group consisting of

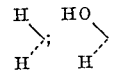

and =O; wherein $R_4$ is selected from the group consisting of hydrogen, fluorine and methyl; and wherein X is selected from the group consisting of hydrogen and lower alkyl.

5. Methyl 16α - chloro - 5α - hydroxy - 6β - methyl-3,11 - diketo - trans - 17(20) - pregnen - 21 - oate, 3-cyclic ethylene acetal.
6. Methyl 16α-chloro - 5α - hydroxy-6β-fluoro-3,11-diketo-trans-17(20)-pregnene - 21 - oate, 3-cyclic ethylene acetal.
7. Methyl 5α,16α-dihydroxy - 6β - fluoro-3,11-diketo-cis-17(20)-pregnen-21-oate, 3-cyclic ethylene acetal.
8. 3-keto - 16 - halo-21-hydroxy-17(20) - pregnen-3-cyclic ethylene acetal of the formula:

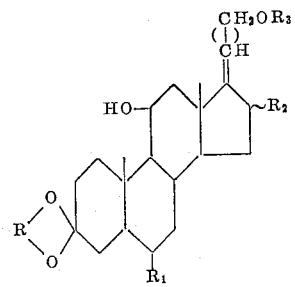

wherein R is an alkylene radical containing up to 8 carbon atoms, inclusive and the attaching oxygen to carbon bonds are separated by a chain of at least 2 and not more than 3 carbon atoms; wherein $R_1$ is selected from the group consisting of hydrogen, methyl and fluorine, wherein $R_2$ is a halogen selected from the group consisting of chlorine and fluorine, and wherein $R_3$ is selected from the group consisting of hydrogen and an acyl radical of a hydrocarbon carboxylic acid containing up to 12 carbon atoms inclusive.

9. 16α-chloro - 5α,11β,21 - trihydroxy-6β-methyl-trans-17(20)-pregnen-3-one, 21-acetate, 3-cyclic ethylene acetal.
10. 6β,16α-difluoro - 5α,11β,21 - trihydroxy-trans-17(20)-pregnen-3-one, 21-acetate, 3-cyclic ethylene acetal.
11. In a process for the production of 16-halocorticoids the step of 16-hydroxyltaing 17(20)-pregnen-21-oic acid esters which comprises: reacting a selected lower alkyl 17-(20)-pregnen-21-oate with the selenium dioxide at a temperature between 0 and 200° C.
12. 16-substituted - 17(20) - pregnen-21-oic, 3-cyclic ethylene acetals of the formula:

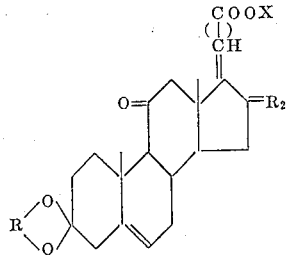

wherein R is an alkylene radical containing up to 8 carbon atoms inclusive and the attaching oxygen to carbon bonds are separated by a chain of at least two and not more than three carbon atoms; wherein $R_2$ is selected from the group consisting of

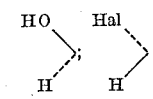

wherein Hal is a halogen selected from the group consisting of chlorine and fluorine.

13. Methyl 16α-chloro - 3,11 - diketo-trans-5,17(20)-pregnadien-21-oate, 3-cyclic ethylene acetal.

14. Methyl 16β-hydroxy - 3,11 - diketo-trans-5,17(20)-pregnadien-21-oate, 3-cyclic ethylene acetal.

15. Methyl 16α - chloro - 5α,6α, - oxido-3,11-diketo-trans-17(20)-pregnen-21-oate, 3-cyclic ethylene acetal.

16. 3-keto - 5α,6α - oxido-16-halo-21-hydroxy-17(20)-pregnene 3-cyclic ethylene acetal of the formula:

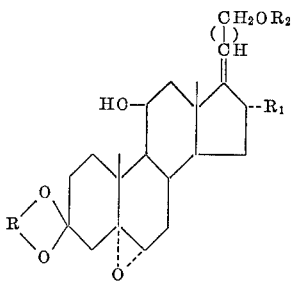

wherein R is an alkylene radical containing up to 8 carbon atoms, inclusive and the attaching oxygen to carbon bonds are separated by a chain of at least 2 and not more than 3 carbon atoms; wherein $R_1$ is a halogen selected from the group consisting of chlorine and fluorine, and wherein $R_2$ is selected from the group consisting of hydrogen and an acyl radical of a hydrocarbon carboxylic acid containing up to 12 carbon atoms inclusive.

17. 16α-chloro - 5α,6α - oxido-11β,21-dihydroxy-trans-17(20)-pregnen - 3 - one, 21-acetate, 3-cyclic ethylene acetal.

18. A process for the production of 6β-substituted 5α, 21-dihydroxy-16-halo-17(20)-pregnenes of the formula:

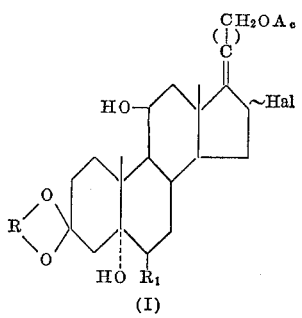

wherein R is an alkylene radical containing up to 8 carbon atoms and the attaching oxygen to carbon bonds are separated by a chain of at least 2 and not more than 3 carbon atoms; wherein $R_1$ is selected from the group consisting of fluorine and methyl; wherein Hal is a halogen selected from the group consisting of chlorine and fluorine and wherein Ac is an acyl radical of from 1 to 12 carbon atoms, which comprises the steps of: (1) treating a compound of the formula:

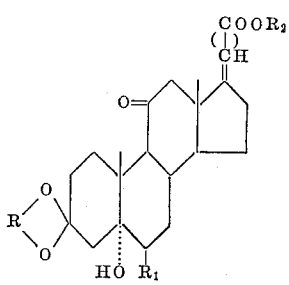

wherein R, $R_1$ and $R_2$ have the same significance as above, and wherein $R_2$ is a lower alkyl radical with selenium dioxide to obtain a compound of the formula:

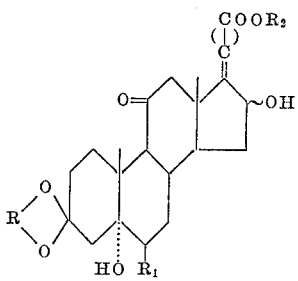

wherein the parameters R, $R_1$ and $R_2$ have the same significance as above; (2) treating this product with a halogenating reagent selected from the group consisting of N-(2-chloro-1,1,2-trifluoroethyl)-di-lower alkyl amine and N,N-dialkyl-1,2,2-trichlorovinylamine, to give a compound of the formula:

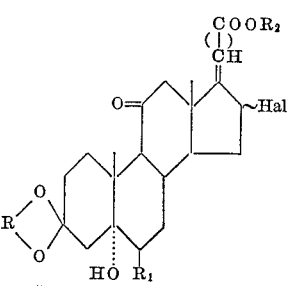

(3) reducing this compound simultaneously in the 11 and 21 positions to obtain a compound of the formula:

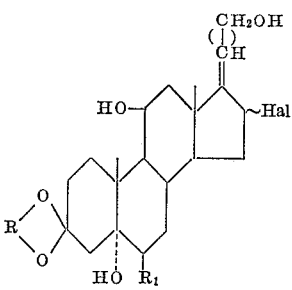

wherein R, $R_1$ and Hal are defined as hereinbefore, and (4) acylating this compound with an acylating reagent selected from anhydrides and chlorides of hydrocarbon carboxylic acids containing from 1 to 12 carbon atoms, to obtain the compound of Formula I.

19. A compound selected from the group consisting of methyl 16α-hydroxy - 3,11 - diketo-cis-1,4,17(20)-pregnatrien-21-oate and methyl-16β-hydroxy - 3,11 - diketo-trans-1,4,17(20)-pregnatrien-21-oate.

References Cited by the Examiner
UNITED STATES PATENTS
3,056,808 10/1962 Ayer _____ 260—397.3
3,158,625 11/1964 Bowers et al. _____ 260—397.1

OTHER REFERENCES
Beal et al.: "J. of Org. Chem. (1961), vol. 26, pp. 3887–3893 relied on.

LEWIS GOTTS, *Primary Examiner.*

ELBERT L. ROBERTS, *Examiner.*